United States Patent [19]

Lucht et al.

[11] Patent Number: 5,099,277
[45] Date of Patent: Mar. 24, 1992

[54] VACUUM PLATEN FOR USE IN A PRINTER

[75] Inventors: Orren J. Lucht, 1481 240th St., Farmington, Minn. 55024; Charles R. Lucht, Bloomington, Minn.

[73] Assignee: Orren J. Lucht, Farmington, Minn.

[21] Appl. No.: 444,813

[22] Filed: Dec. 1, 1989

Related U.S. Application Data

[63] Continuation-in-part of Ser. No. 278,668, Dec. 1, 1988, Pat. No. 4,931,826.

[51] Int. Cl.⁵ .............................. G03B 27/60
[52] U.S. Cl. ................................. 355/73
[58] Field of Search .................... 355/72, 73, 28

[56]  References Cited

U.S. PATENT DOCUMENTS

| | | | |
|---|---|---|---|
| 2,292,521 | 8/1942 | Horn | 271/74 |
| 2,482,571 | 9/1949 | Arnold | 95/44 |
| 2,484,972 | 10/1949 | Turrettini | 88/24 |
| 2,600,469 | 6/1952 | Breuers et al. | 95/77.5 |
| 2,753,181 | 7/1956 | Anander | 271/2.3 |
| 2,804,304 | 8/1957 | Taini | 271/64 |
| 2,892,379 | 6/1959 | Cooper | 88/24 |
| 3,220,723 | 11/1965 | Rabinow | 271/74 |
| 3,269,627 | 8/1966 | O'Brien | 226/179 |
| 3,292,485 | 12/1966 | Mey | 88/24 |
| 3,379,436 | 4/1968 | Flynn et al. | 271/74 |
| 3,425,777 | 2/1969 | White | 355/28 |
| 3,468,606 | 9/1969 | Wolf et al. | 355/91 |
| 3,511,565 | 5/1970 | Harman, Jr. et al. | 355/56 |
| 3,536,401 | 10/1970 | Mason et al. | 355/28 |
| 3,563,637 | 2/1971 | Ferguson | 350/255 |
| 3,640,198 | 2/1972 | James | 95/13 |
| 3,689,150 | 9/1972 | Nothmann et al. | 355/64 |
| 3,721,375 | 3/1973 | Roberts et al. | 225/96 |
| 3,754,824 | 8/1973 | Weisglass et al. | 355/35 |
| 3,826,571 | 7/1974 | Spence-Bate | 355/46 |
| 3,890,045 | 6/1975 | Bernstein et al. | 355/73 |
| 3,914,721 | 10/1975 | Pollock | 355/35 |
| 3,936,185 | 2/1976 | Gross | 355/73 |
| 3,951,545 | 4/1976 | Lucht | 355/46 |
| 3,966,320 | 6/1976 | Wiessner | 355/73 |
| 4,027,968 | 6/1977 | Spence-Bate | 355/46 |
| 4,148,476 | 4/1979 | Brekell | 271/194 |
| 4,177,983 | 12/1979 | Wossler | 271/268 |
| 4,220,410 | 9/1980 | Bloodgood | 355/18 |
| 4,229,098 | 10/1980 | Schmoker | 355/60 |
| 4,283,136 | 8/1981 | Swift et al. | 355/45 |
| 4,285,590 | 8/1981 | Silverberg | 355/73 X |
| 4,324,487 | 4/1982 | Nishihama | 355/73 |
| 4,583,845 | 4/1986 | Lucht et al. | 355/46 |
| 4,595,283 | 6/1986 | Bartz et al. | 355/73 |
| 4,737,824 | 4/1988 | Sakai et al. | 355/73 X |
| 4,754,307 | 6/1988 | Burki et al. | 355/46 |
| 4,786,944 | 11/1988 | Sakamoto et al. | 355/20 |
| 4,821,079 | 4/1989 | Yoder | 355/74 |
| 4,931,826 | 6/1990 | Lucht et al. | 355/72 X |

FOREIGN PATENT DOCUMENTS 1184203 12/1964 Fed. Rep. of Germany ........ 355/73

Primary Examiner—Donald A. Griffin
Attorney, Agent, or Firm—Merchant, Gould, Smith, Edell, Welter & Schmidt, P.A.

[57]  ABSTRACT

A platen 23, 96 having a series of channels 174 which are in fluid communication with a vacuum and a fluid source. The grooves 174 preferably extend through an end of the platen 23 to the atmosphere such that the vacuum has a maximum value. The platen 23, 96 is used in a printer-processor 10 which has a printing unit 11 and a processing unit 12. A light source 18 directs light 64 toward light-sensitive photographic printing material 22 held by the platen 23, 96. A transport system 132 conveys the print material 22 from the platen 23, 96 to the entrance 29 of the processor 12.

12 Claims, 12 Drawing Sheets

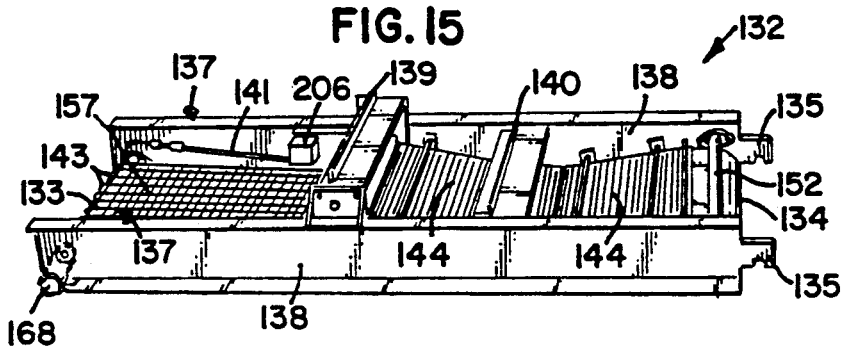
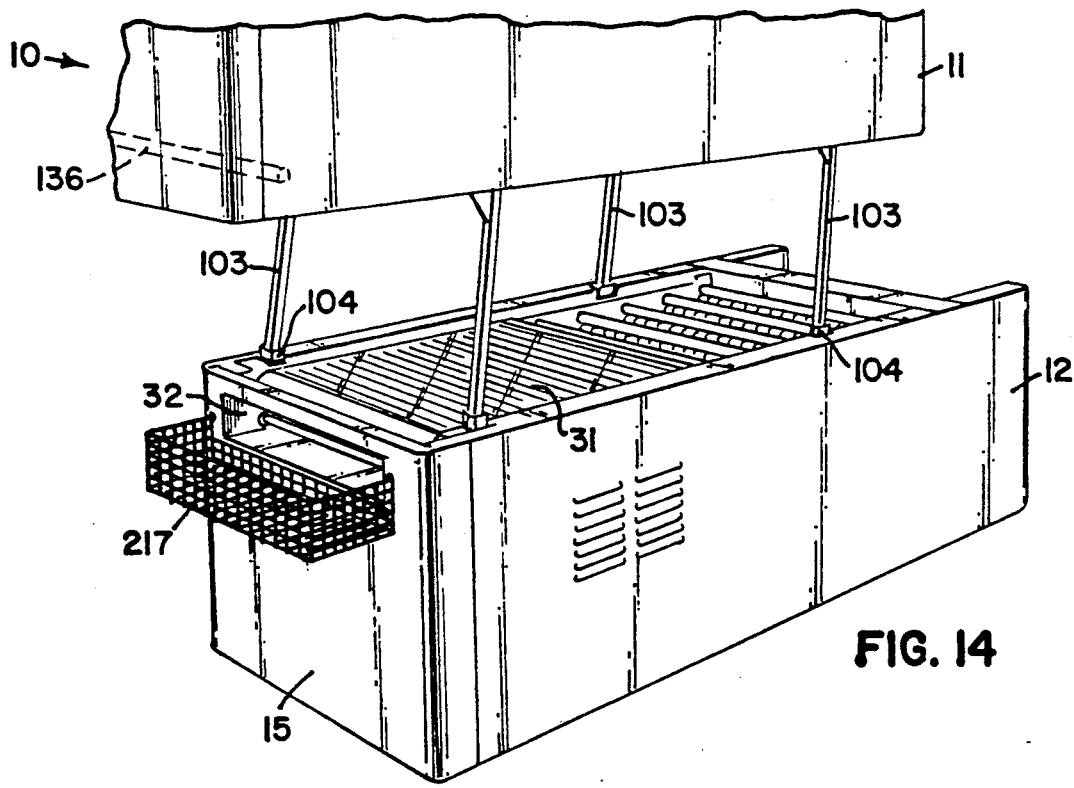

VACUUM PLATEN FOR USE IN A PRINTER

This is a continuation-in-part of our prior application Ser. No. 07/278,668, filed Dec. 1, 1988 now U.S. Pat. No. 4,931,826 issued June 5, 1990.

FIELD OF THE INVENTION

The present invention relates generally to photography and, more particularly, to an apparatus which holds light sensitive material during exposure utilizing a vacuum.

BACKGROUND OF THE INVENTION

To make a finished photograph from a negative, the image on the negative is printed on light-sensitive photographic paper and the exposed paper is processed. To accomplish this, light is passed through the negative and lenses and onto the printing material. The printing paper is coated with a light-sensitive emulsion containing crystals of silver atoms combined with bromine or chlorine atoms or both. With conventional processing procedures, the printing paper is placed in a developer for several minutes so that chemical action can convert the crystals that have been exposed to the light into metallic silver. The printing paper is next typically transferred to a chemical solution called a stop bath to halt the action of the developer, then is put in a fixer, which removes undeveloped and unexposed crystals, and finally it is washed and dried. This results in a permanent, positive image, the dark areas of the permanent image corresponding to the light areas of the negative, which were generated by the dark areas of the original scene.

Photographic printers and processors are utilized by photofinishers, laboratories, one-hour studios, and other companies in the photography industry. Automatic printers typically include supply and take up rollers for the photosensitive photographic material and a mechanism to automatically advance the material through an exposure area or station. The image to be exposed is established in known manner and projected on the photographic printing paper in the exposure area, with a shutter being employed to control the exposure.

However, conventional printers typically require that the roll of photographic printing material be loaded and unloaded from the printer under darkroom conditions. An operator is needed to manually transfer the exposed sheets or paper roll to the processor, which is often located in a separate room. In addition, the user must often allow an entire roll of paper to be exposed before the paper can be removed to the processor. These procedures are time-consuming and inefficient, resulting in slower photofinishing productivity. Although transport systems which transfer paper from the printer to the processor have been utilized, these devices typically accommodate only a limited number of sheets of exposed printing paper, and they provide limited means to automatically accumulate the printing paper if the processor is in operation.

Another difficulty with conventional printers is that they are sometimes designed to accommodate only a single lens so that the possible print sizes are limited. In printers which enable multiple lenses to be used, changing lenses can be a complicated process. The arrangement for holding the various lenses, such as a lens drawer system, can be quite complex and heavy and may require manual operation. Most conventional printers and processors also accommodate only a single size roll of paper, with only a single paper plane. This also limits the size of photographs which can be produced.

During exposure of the image upon the printing paper, it is important to maintain the printing paper flat and straight against the paper plane in order to produce a clear and properly positioned image. However, automatic advance of the paper across the paper plane sometimes hinders this. One conventional solution has been a paper plane or platen having a series of isolated perforations through which a vacuum is applied. But the number of air leaks decreases as more paper covers the platen, resulting in increased pressure on the paper. This effect results in a non-uniform vacuum, and places a substantial burden on the paper advance drive means.

The present invention addresses these and many other problems associated with currently available methods and apparatus relating to photographic printer-processors.

SUMMARY OF THE INVENTION

The present invention is a platen for use in an apparatus for printing and processing photographs, the apparatus comprising: a light source which directs light toward light-sensitive photographic print material; a platen for supporting the print material in a flat configuration; a processor for processing the exposed print material; and means for automatically transporting the print material from the platen to the entrance of the processor. The transport means includes a pre-accumulation conveyor system and a post-accumulation conveyor system, between which is a holding area for accumulating the exposed print material. The accumulation system preferably has a stop roller assembly which, when stationary, causes the accumulation and, when rotating, causes transfer of the print material into the processor.

In the preferred embodiment, the printer of the present invention has two platens in a parallel relationship so as to accommodate two widths of print material. The forward platen is movable between a first position within the path of the light beam and a second position outside the path of the light beam, the second position allowing for the rear platen to be within the path of the light beam. The platens preferably have a planar printing surface with a plurality of longitudinal grooves through which a vacuum is applied so as to maintain the print material flat against the platen.

One advantage of the printer-processor of the present invention is that it is a single unit which automatically performs all of the photographic printing and processing functions which are normally performed by a plurality of different machines which require manual monitoring. The printer-processor is contained within a single, relatively compact housing which frees up both time and space for the photographic laboratory or studio.

The printer-processor is an automatic apparatus, requiring little monitoring by the operator. The operator simply enters information through a keyboard, including print size, quantity, exposure data, processing data, etc. Accordingly, the operator need not be a person having highly-developed skills in the photography field. Further, only a single operator is needed to print and process the photographs when utilizing the present invention.

The printer-processor of the present invention allows the complete photographic printing and processing operation to take place in the absence of darkroom conditions; that is, the laboratory or studio can print and process the negatives in normal room light. The printing paper roll can be kept in a light-tight canister and loaded into the printer under room light conditions. The transport system automatically feeds the exposed paper from the printer and into the processor. The complete printing and processing operation occurs without regard to the room's lighting.

While the present invention utilizes multiple paper planes or platens, with each platen accommodating a different width paper only one platen need be utilized, as those skilled in the art will recognize. By using two platens, however, a wide variety of different image sizes can be printed.

As noted above, a feature of the improved paper platen design is that a vacuum is applied through a series of longitudinal grooves to hold the printing paper flat against the printing platen's surface. This design allows the vacuum across the platen to be more uniform, provides edge-to-edge print sharpness and reduces the load upon the paper advance system.

In the preferred embodiment, the grooves open to a fluid source such that as the paper advances across the full longitudinal length of the platen, the vacuum remains relatively constant. The paper advance mechanism is thereby not unduly loaded. Further, the paper advances without creating stresses which may tend to wrinkle or crease the paper. The plurality of grooves are preferably arranged to create a series of alternating raised and lowered portions. The ratio of raised portions (i.e., the mean surface of the platen) and lowered portions (i.e., the grooves) are arranged and configured such that the paper is held in a single plane to improve sharpness during exposure of the print.

Therefore, according to one aspect of the present invention, there is provided a platen for use in a photographic printer, comprising:

(a) a housing having a substantially planar printing surface, said printing surface having a plurality of longitudinal grooves in fluid communication with a fluid source; and (b) vacuum means in fluid communication with said grooves wherein a vacuum is applied so as to hold printing paper against said platen during exposure of the paper and wherein the grooves are arranged and configured so as to establish a maximum vacuum value. For a better understanding of the invention, and of the advantages obtained its use, reference should be made to the Drawings and accompanying descriptive matter, in which there is illustrated and described a preferred embodiment of the invention.

BRIEF DESCRIPTION OF THE DRAWINGS

In the Drawings, which form a part of the instant specification and are to be read therewith, an optimum embodiment of the invention is shown, and, in the various views, like numerals are employed to indicate like parts:

FIG. 14 is a perspective view of the printer-processor shown in FIG. 1 with the printer elevated above the processor;

FIG. 15 is a perspective view of the accumulation and transport means;

FIG. 20b is a cross sectional view of the platen taken through line 20b–20b of FIG. 20a.

DETAILED DESCRIPTION OF THE PREFERRED EMBODIMENT

Figure 1:
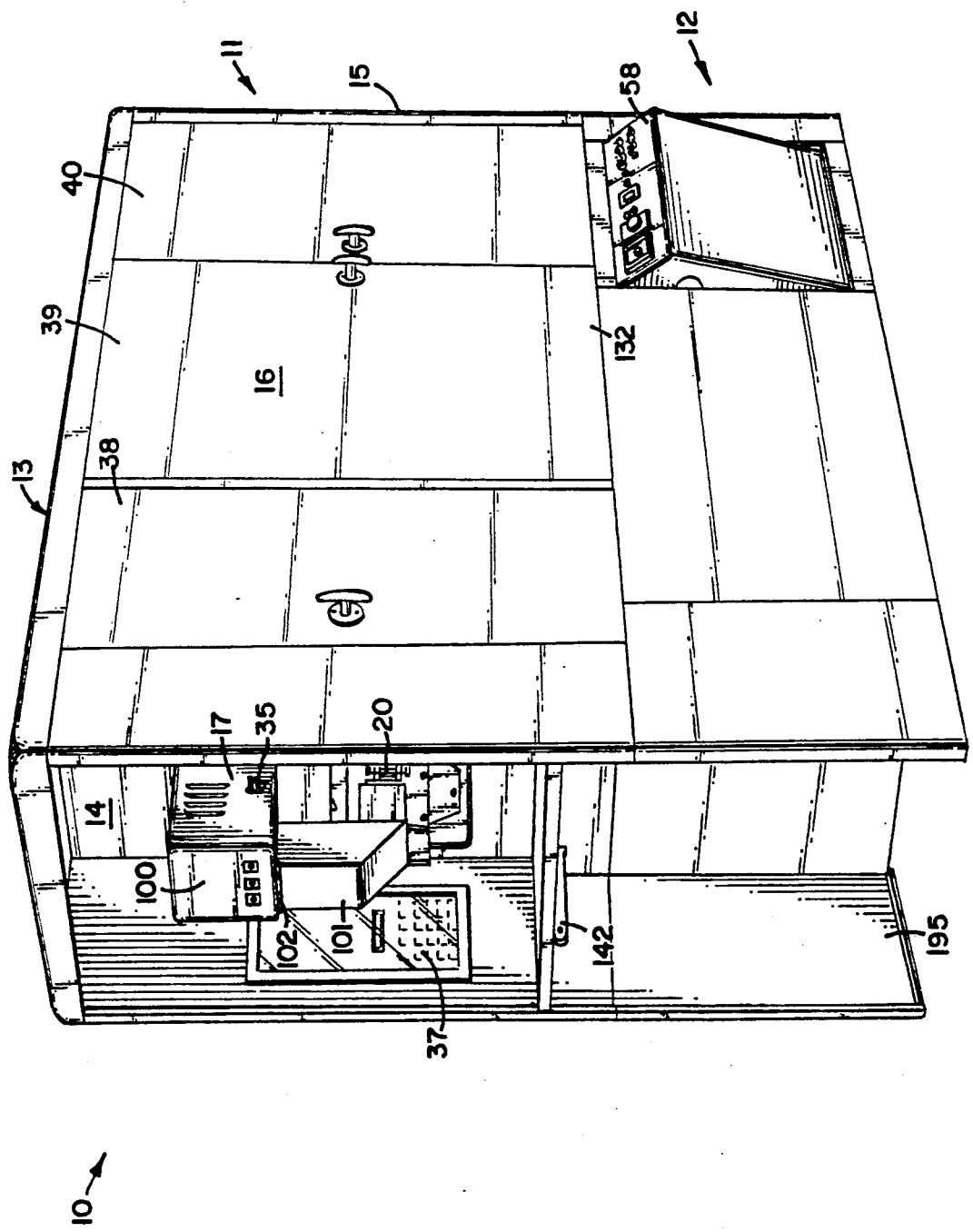
FIG. 1 is a perspective view of the printer-processor of the present invention.
Figure 13:
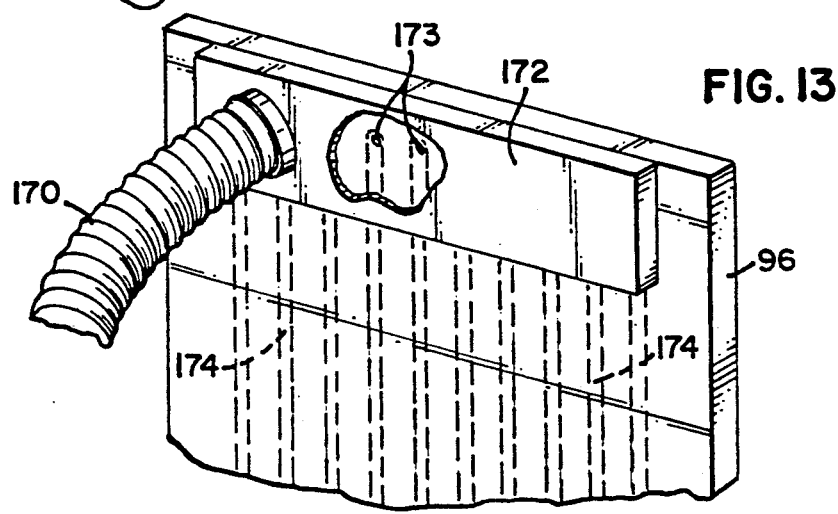
FIG. 13 is a perspective view of one of the platens.

Referring to the Drawings, the photographic printer-processor apparatus is illustrated generally at 10 in FIG. 1. An example of platen 23, 96 constructed according to the principles of the present invention is illustrated in FIGS. 13 and 20. The principles of the present invention apply to each of the platens 23, 96. Therefore, reference is made solely to platen 23 from time to time herein. To facilitate understanding of the novel platen 23, however, a detailed discussion of the platen 23 will be deferred pending a description of an example of a printer-processor 10 in which the platen 23 may be utilized.

1. Description of Printer Processor Apparatus 10

The apparatus 10 for printing and processing photographs includes two primary components: a printing unit 11 and a processing unit 12. The printer 11 exposes the image of the negative onto light-sensitive emulsion paper 22, and the processor 12 processes the exposed paper to produce a finished photograph. In the preferred embodiment, the processor 12 rests upon the floor, with the printer 11 being above the processor 12. A transport system 132 which moves paper from the printer 11 to the processor 12 is located proximate the lower end of the printer 11. The apparatus 10 has a frame 195 consisting of suitable panels and structural bracing for the support of the elements of the photographic printer-processor 10. The printer-processor 10 is generally rectangular in shape, having a top wall 13, a front wall 14, a back wall 15, and two longitudinal sides 16. The printer-processor 10 is less than six feet in length and less than six feet tall, so that it does not require a great deal of space. The apparatus 10 is a single structure; that is, it does not require several independent units spaced from each other. The printer-process 10 is relatively compact and requires little manual intervention by the operator.

A control panel 37 governs the operation of the printer 11, and a control panel 58 controls the operation of the processor 12. The printer 11 has three doors on one of its sides 16, the three doors opening into three areas or chambers 38, 39, 40. The first chamber 38 houses the printer's optical system; the second chamber 39 houses the exposure area; and the third chamber 40 is a holding area capable of receiving any exposed print material which is being maintained in the accumulation system before the paper 22 is transferred to the processor 12.

Figure 2:
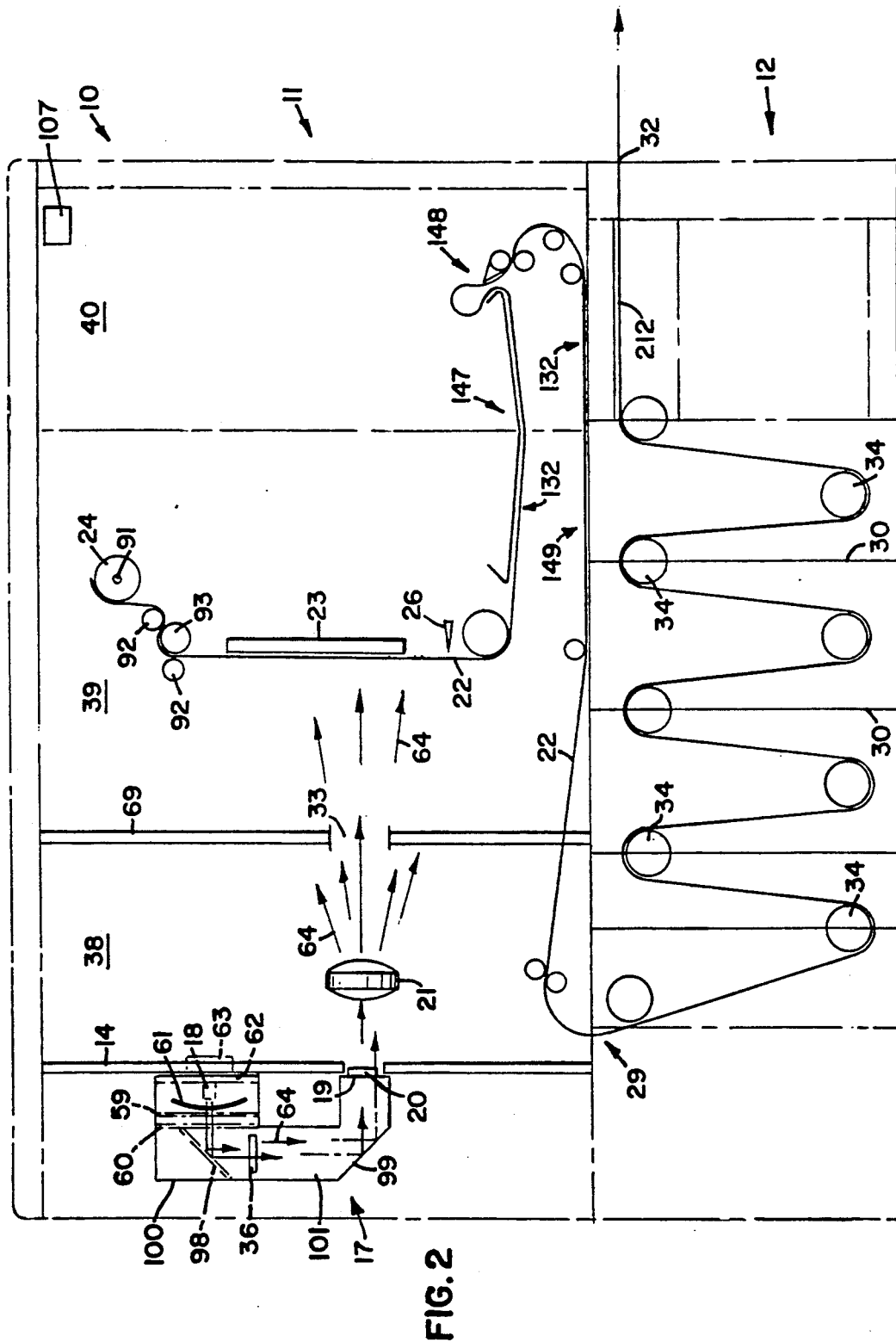
FIG. 2 is a schematic view of the operation of the printer-processor illustrated in FIG. 1.
Figure 10:
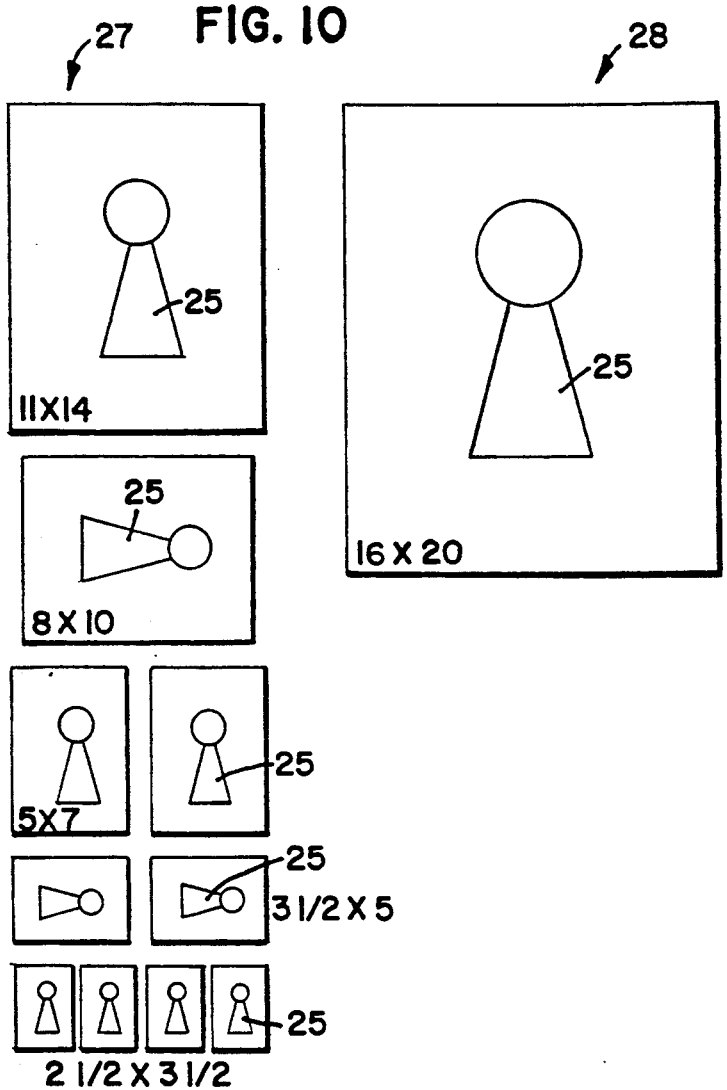
FIG. 10 is a view of images produced by the printer-processor of the present invention.

The general operation of the printer-processor 10 is illustrated by the diagramatic view of FIG. 2. The negative 19 is positioned in a negative carrier 20, and a light beam is directed from a light source 18 through the negative 19. The light rays 64 go through a lens system 21 which provides the desired enlargement of the image 25 (FIG. 10). The light rays pass through an opening 33 and onto the photosensitive photographic material or printing paper 22. The printing paper 22 is stored in a continuous roll on a spool 24, and it is positioned flat against a platen 23 when the exposure is made.

After the exposure is complete, the paper 22 is automatically advanced to the processor 12 by means of a transport or feed system 132. The paper 22 is first advanced downwardly into a pre-accumulation system 147. At the appropriate point, the exposed paper 22 is cut by a cutter 26. If the processor 12 is not ready to receive the paper 22, it is accumulated in an accumulator system 148. After accumulation, the paper 22 is then fed through a rapid transport system 149 and moved into the entrance 29 of the processor 12. Once in the processor 12, the paper 22 moves around a series of rollers 34 and through a series of tanks 30 which contain the appropriate processing chemicals. The paper 22 is then passed through a drier 212 and exits from point 32 at the rear end 15 of the processor 12 as a finished, dry photograph.

As illustrated in FIGS. 1 and 2, the lamphouse 17 provides light for the printing operation and directs the light 64 through the negative 19. It has two primary components, an upper housing 100 and a lower mirror box 101. The mirror box 101 is pivotably connected to the upper portion 100 by means of a hinge 102 and contains the lower mirror 99. Alternatively, the mirror box 101 could be removable from the upper housing 100 by means of a transverse sliding arrangement. The mirror box 101 has a mirrored inside surface to reflect the light from the light source 18 toward the negative 19. When the mirror box 101 of the lamphouse 17 is moved away from the front wall 14, the negative carrier 20 is exposed for easy access by the operator.

The lamphouse 17 of the present invention has optical components which are positioned to allow the lamphouse 17 to be relatively lightweight and compact. The negative 19 is held in place by means of a negative carrier 20. The light is directed through the negative 19 and is focussed by a lens 21 to cast an image 25 of the negative on the printing paper 22.

A light source or means for projecting a light beam 18 is located in the upper housing 100 of the lamphouse 17. Any suitable light source, such as a high-intensity lamp, may be employed. As illustrated in FIG. 2, the light source 18 is positioned on the left side of the negative holder 20, and the photographic print material 22 is supported on the right side of the negative holder 20 at a proper distance therefrom. A beam 64 from the light source 18 is projected through the negative 19 held by the negative carrier 20 to the print material 22.

Proximate the light source 18 is a spherical or parabolic reflector 61. The reflector 61 directs light toward a "cold mirror" or coated glass 62 which absorbs heat or infrared light from the light beam 64 and directs it into a blower 63 which is located behind the cold mirror 62. The cold mirror 62 reflects the useful light through an opening in the reflector 61. An exhaust blower 63 keeps the lamphouse 17 from overheating so that the printer-processor 10 can be used continuously. The lamphouse 17 also preferably contains suitable diffusion glass 36 which enables the light to be spread uniformly.

Behind the reflector 61 is a shutter 59 which opens momentarily for a predetermined amount of time to control the exposure, i.e., the amount of light passing through the lens system 21. For color printing, a range of color filters 60 are interposed between the light source 18 and the negative 19 to control the photograph's color balance. The filters 60 can be controlled either by manual knobs 35 or by known automatic means. The light passes onto angled mirrors 98, 99, and then toward the right as viewed in FIG. 2. The light is then directed through the negative 19 held within the negative carrier 20.

Figure 3:
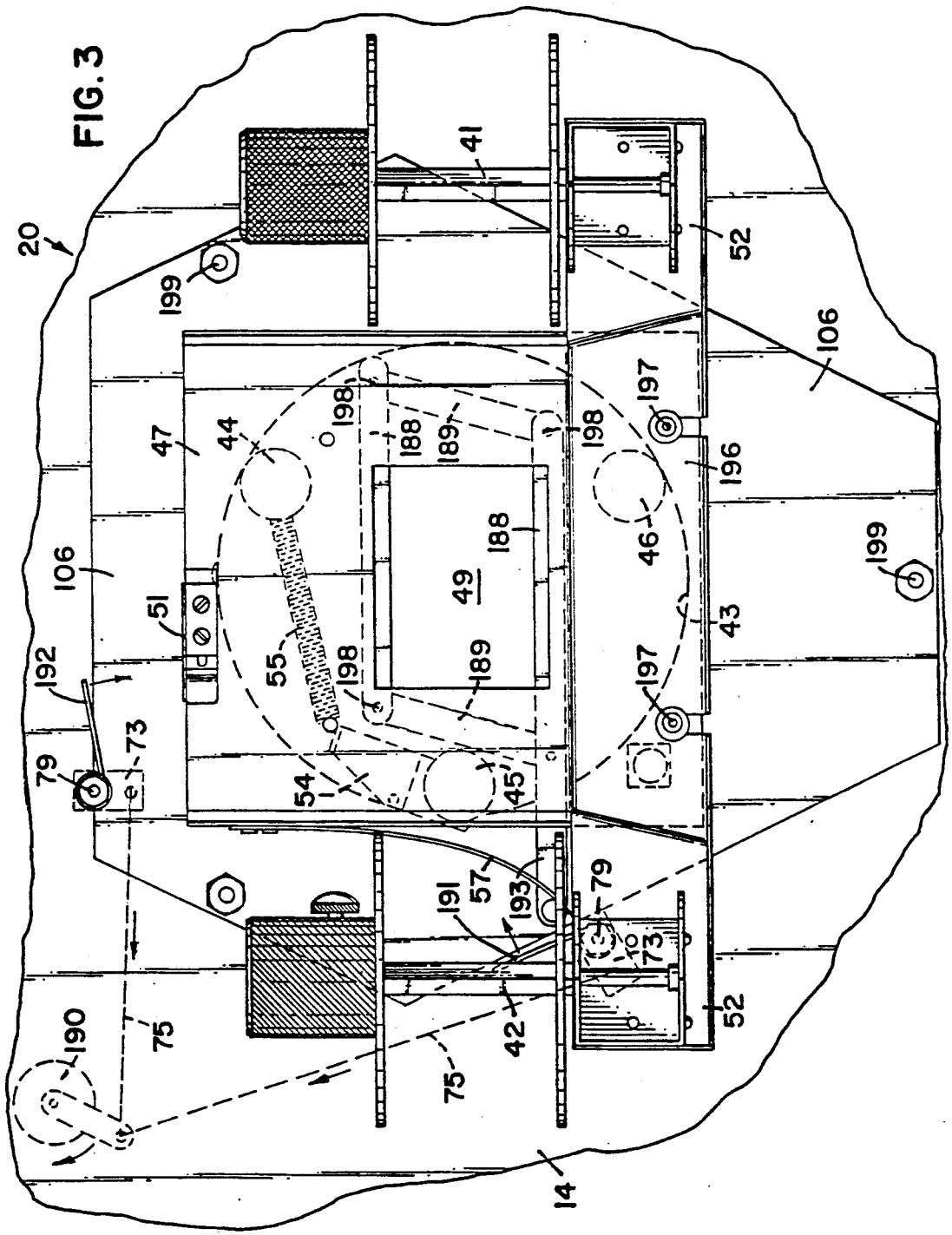
FIG. 3 is a front elevational view of the negative carrier used with the printer-processor.
Figure 4:
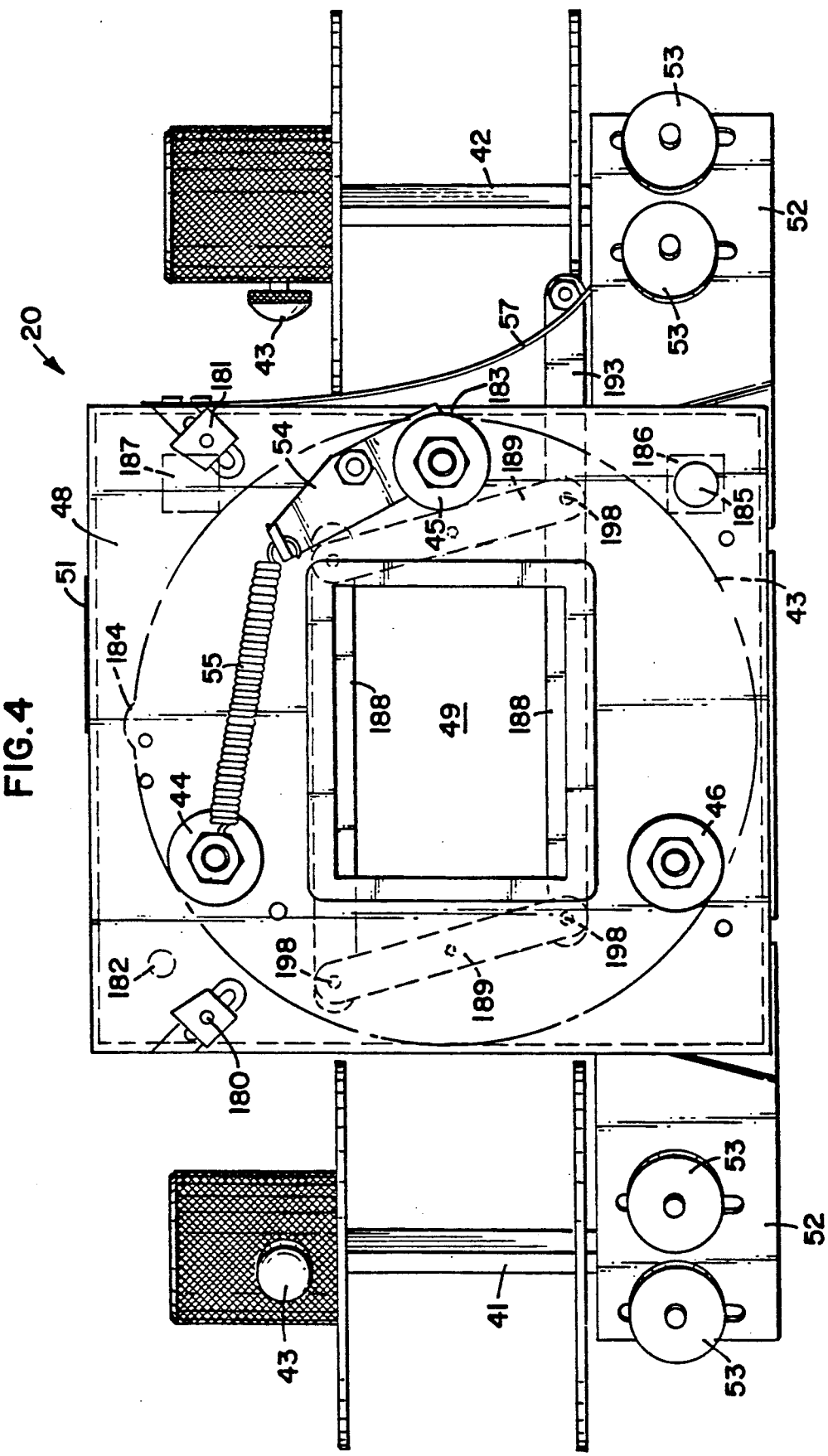
FIG. 4 is a rear elevational view of the negative carrier utilized with the printer-processor.
Figure 5:
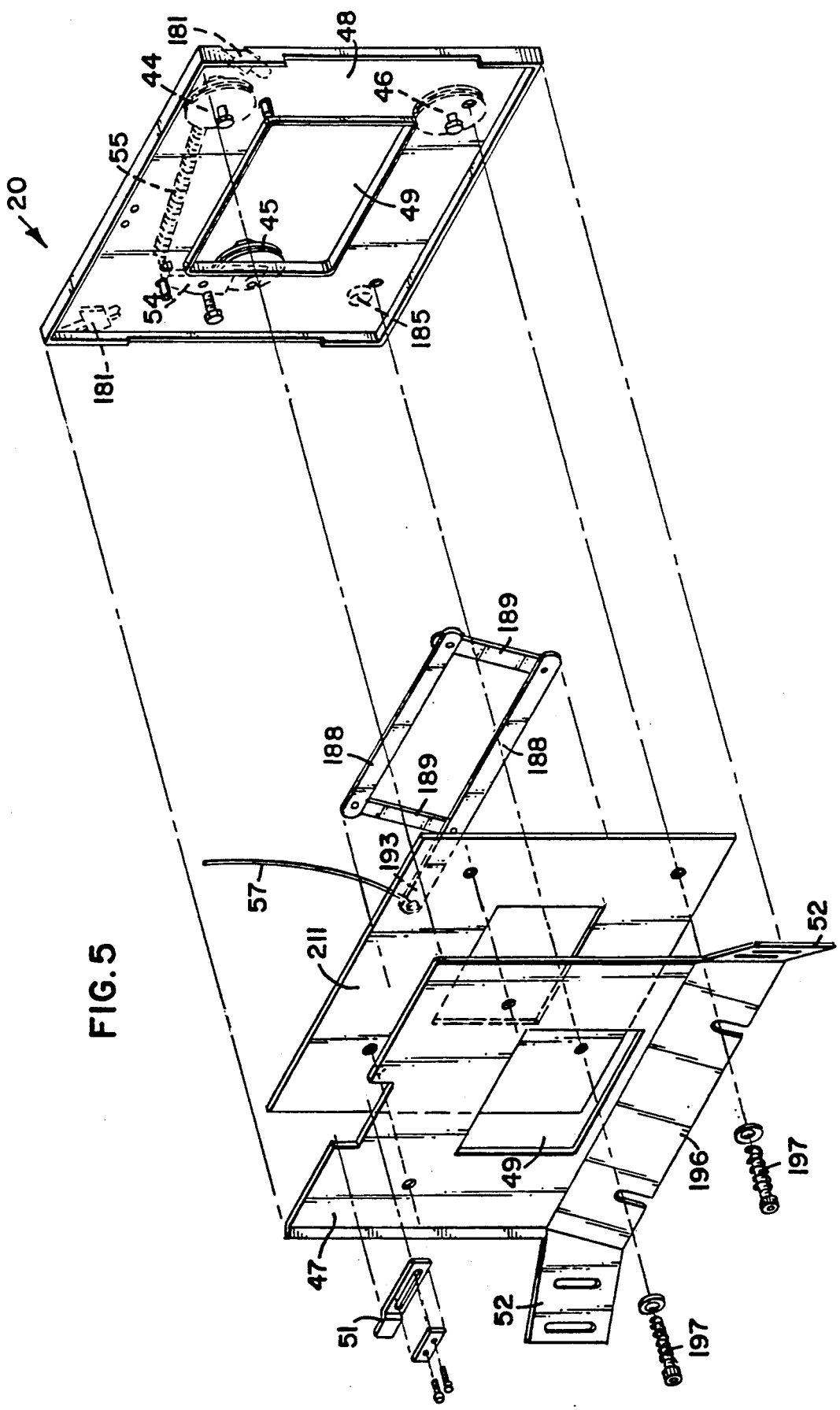
FIG. 5 is an exploded perspective view of the negative carrier illustrated in FIGS. 3-4.

The negative carrier 20 holds the negative 19 in a flat condition so as to permit the optical passage of the light beam 64 therethrough. The front of the negative carrier 20 is illustrated in FIG. 3; the back of the negative carrier is illustrated in FIG. 4; and an exploded view of the components of the negative carrier is illustrated in FIG. 5. The negative carrier 20 is mounted against the front wall 14 of the printer 11, behind the lamphouse 17. As illustrated in FIG. 3, the negative carrier 20 is preferably attached to a mounting plate 106 within the wall 14 by means of a plurality of standoff fasteners 199. The fasteners 199 allow for adjustment of the plate 106 and negative carrier 20 for focussing purposes. The mounting plate 106 has a circular aperture 43 to permit light into the optical chamber 38.

The negative carrier 20 is suitable for use with roll film, card-mounted film, or cut film. A different size negative requires a negative carrier having a different aperture size 49. If a different size film is substituted, a different negative carrier 20 as well as a different corresponding lens system is utilized. In the preferred embodiment, the negative carrier 20 is replaced as a unit when the photofinisher changes the negative size. When roll film is utilized, the roll of film (not shown) is moved between a first spool 41 and a second spool 42. The spools 41, 42 have release adjustment screws 43. The film spools 41, 42 are mounted to the negative carrier 20 by means of a pair of lower support flanges 52 and fasteners 53.

The negative carrier 20 consists of two flat plates which hold the negative 19. The front plate or negative hold-down plate 47 (i.e., toward the left side as viewed in FIGS. 2 and 5) and the second, back plate 48 of the negative carrier 20 are in a parallel and abutting relationship. The plates 47, 48 preferably have a central, rectangular aperture 49 which is aligned with the central portion of the aperture 43 in the mounting plate 106. The negative (not shown) is positioned between the two plate apertures 49 to allow the light to be directed therethrough.

Suitable releasable fasteners interconnect the plates 47, 48. In the preferred embodiment, a sliding bracket 51 interconnects the upper end of the plates 47, 48. In its locked position, the bracket or catch 51 holds the plates 47, 48 in a juxtaposed, abutting relationship against each other. When the bracket 51 is in its disengaged, unlocked position, the front plate 47 can be rotated away from the back plate 48. In the preferred embodiment, the lower end 196 of the front plate 47 is angled somewhat outwardly from the flat portion of the plate 47 surrounding the aperture 49. A pair of knobs 197 interconnect the lower end of the plates and allow the plates to be separable when desired. In this manner, the fasteners provide a means for separating at least a portion of the plates 47, 48 from one another to allow for insertion, removal and advancement of the film. The manual separation of the plates 47, 48 allows the operator to adjust the position of the negative 19 within the carrier 20. Alternatively, known mechanical means can be employed to allow the plates 47, 48 of the negative carrier 20 to be separated without requiring the operator to do so manually.

As illustrated in FIG. 10, some image sizes require a vertical orientation of the negative 19, whereas other sizes require a horizontal orientation in order to utilize the printing paper 22 in an efficient manner. The negative carrier 20 includes rotation means for moving the entire negative carrier with respect to the plate 106 on the printer wall 14 in a rotary manner between angular positions at least at right angles to one another. This is accomplished by a plurality of rollers 44, 45, 46 which are mounted on the back plate 48 and which fit within the aperture 43 to interconnect the negative carrier 20 to the front mounting plate 106 of the printer 11. The rollers 44, 45, 46 preferably have edges with a V-shaped configuration, which correspond to a corresponding V-shaped edge of the aperture 43. In the preferred embodiment, the position of two of the rollers 44, 46 are fixed with respect to the plate 48. The rollers 44, 46 are cam adjustable in the preferred embodiment to assure that the aperture 49 is aligned with the center of rotation regardless of its rotary position. The third roller 45 is spring-loaded or biased by being interconnected to an arm 54 and spring 55 which are attached on the opposite end to a fixed roller or other fixed point on the back plate 48. Thus, the negative carrier 20 is positioned within the circular aperture 43 by lining up the spring-loaded roller 45 against the edge of the aperture 43 and then moving the fixed rollers 44, 46 into the aperture 43. In this manner, the negative carrier 20 is easily rotatable within the aperture 43. Also, the entire negative carrier 20, including both interlocked plates 47, 48 may be removed from the printer wall 14 as a unit, while preserving the interlocked relationship of the plates 47, 48.

The negative carrier 20 also includes holding means for maintaining the appropriate angular position of the negative carrier 20 and negative 19. The negative carrier 20 has two stop members 180, 181 on the back plate 48, one of which abuts a stationery screw 182 on the mounting plate 106 when the negative 19 is in either the vertical or horizontal orientation. To maintain the desired orientation, the spring-loaded roller 45 aligns and fits within one of two detents 183, 184 which are formed within the circular aperture 43. Whereas the illustrated negative carrier assembly provides for two positions of angular rotation which are ninety degrees apart, it is also possible to orient the negative 19 in other angular orientations according to the present invention.

A sensing mechanism in the preferred embodiment verifies that the negative 19 is in the correct orientation. Preferably, the sensing means comprises a movable magnet 185 attached to the back rotatable plate 48 and a pair of stationary electrical sensors 186, 187 on the mounting plate 106 which are actuated by the magnet 185. The control system senses the orientation of the negative carrier 20 and tells the operator whether the negative carrier 20 is in proper position or whether it should be rotated, depending upon the size of the image 25 being printed.

The negative carrier assembly 20 also preferably includes means for cropping a negative 19. The machine automatically crops the size of the aperture 49 according to the proportions of the image 25 desired and lens utilized. The negative carrier 20 has two cropping blades 188 which are mounted in parallel relationship to each other at the ends of pivotable spacer arms 189. The spacer arms 189 are substantially parallel to each other and mounted for pivotal action at the points 198. Accordingly, the cropping blades 188 and spacer arms 189 form a rectangle when in the open, deactivated condition; and move in a parallelogram relationship when in the cropped position illustrated in FIGS. 3, 4 and 5. Preferably, biasing means 57 hold the blades 188, 189 in the cropped position, unless they are activated by the cropping power means. If desired, a similar cropping assembly may be employed on all four sides of the image.

The cropping blades of the negative carrier 20 are activated by suitable power means such as a solenoid 190. The solenoid 190 is interconnected to a pair of rotatable paddles 191, 192 which are in a disengageable relationship to the primary control arm 193 of the cropping blades 188. The paddles 191, 192 correspond with the horizontal and vertical angular positions of the negative carrier 20. The movement of these components is illustrated by the arrows in FIG. 3.

As shown in the exploded view of FIG. 5, the cropping blade assembly is positioned between the plates 47, 48. In the preferred embodiment, the cropping blades are mounted upon a rectangular plate 211 having a central aperture. The plate 211 is attached to the back plate 48 by means of adhesive. The paddles 191, 192 are mounted upon the front wall 14 of the printer proximate the edges of the mounting plate or triangle 106. When the paddles 191, 192 rotate in a clockwise direction, one of the paddles pushes against the control arm 193 of the cropping blade assembly, thereby moving the cropping blades 188 from a cropped position to an uncropped position. The solenoid 190 is interconnected to arms 73 of the paddles 191, 192 by suitable linkages 75. The solenoid 190 and linkages 75 move as shown by the arrows of FIG. 3, thereby causing rotation of the paddles 191, 192 about the pivot points 79.

Between the negative carrier 20 and the print material supporting means 23 is located an optical chamber 38 which contains and supports the lens system 21. The lens system 21 bends and focuses the light rays 64 passing through the negative 19 to form an enlarged image 25. The lens' focal length and the distance between the lens 21 and the image 25 determine the enlargement size.

Figure 7:
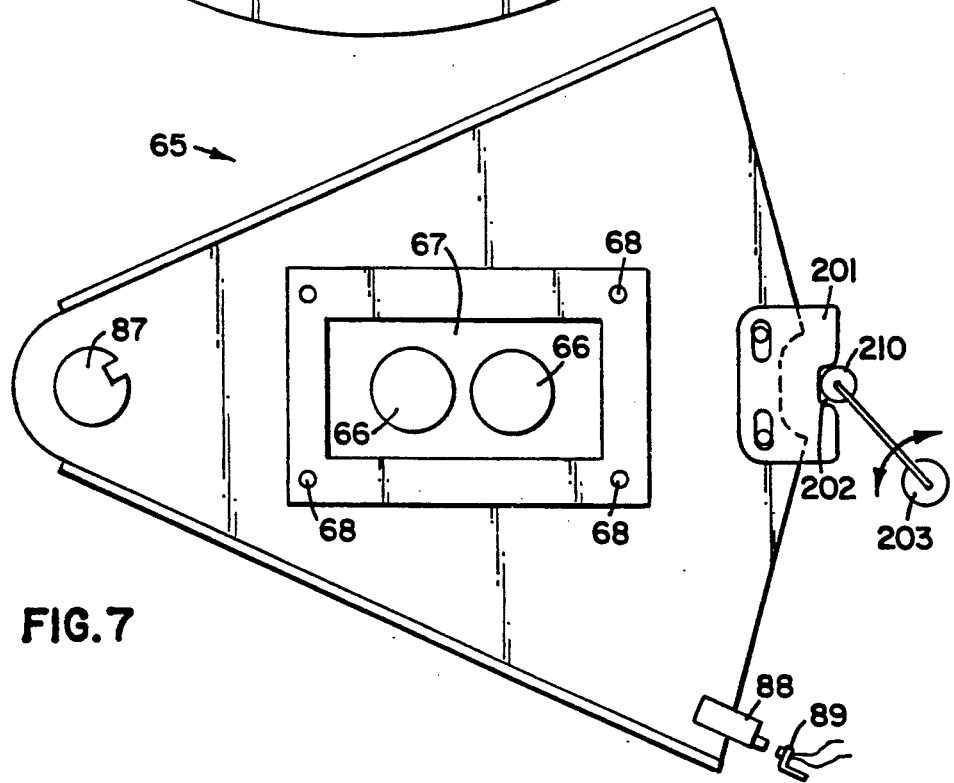
FIG. 7 is a side elevational view of a lens deck utilized with the lens carousel illustrated in FIG. 5.
Figure 8:
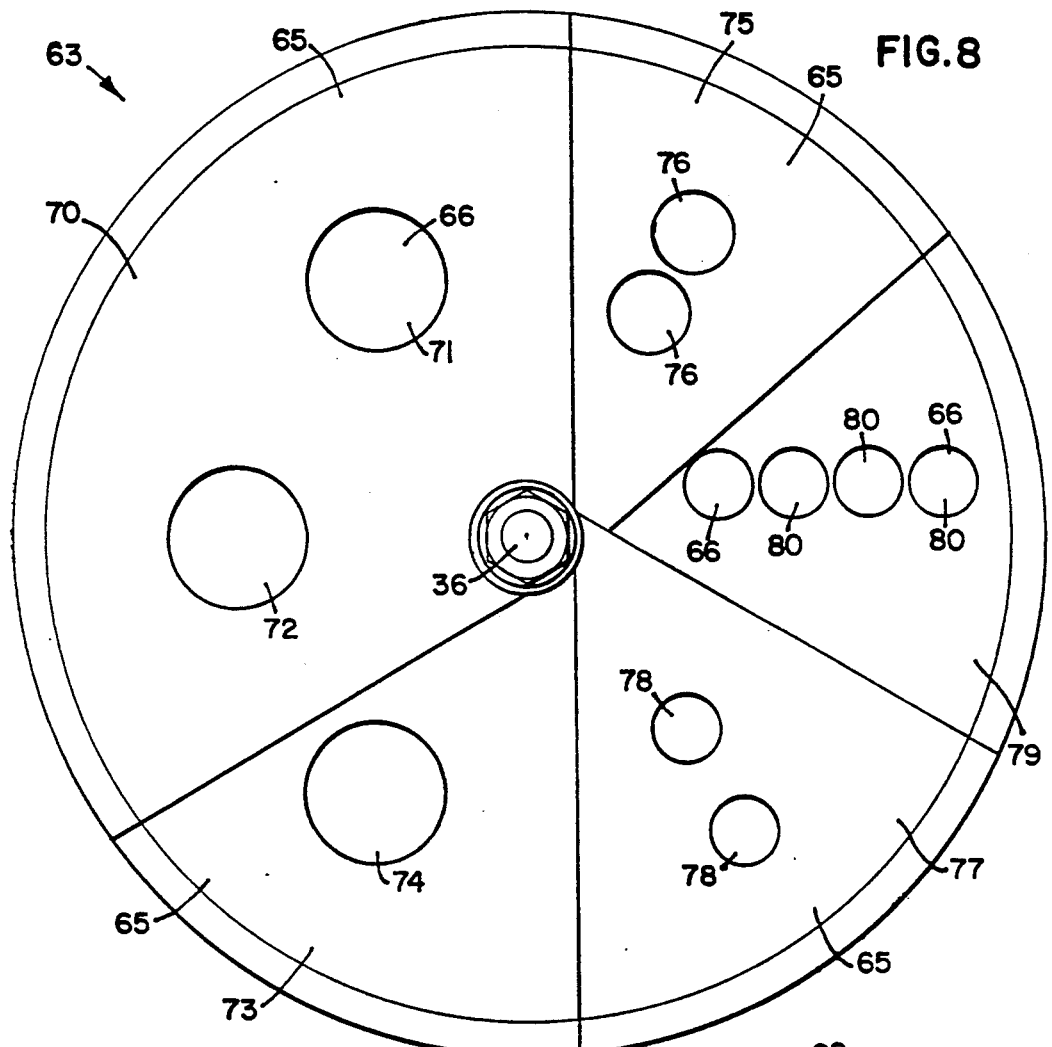
FIG. 8 is a front elevational view of the lens carousel assembly.
Figure 11:
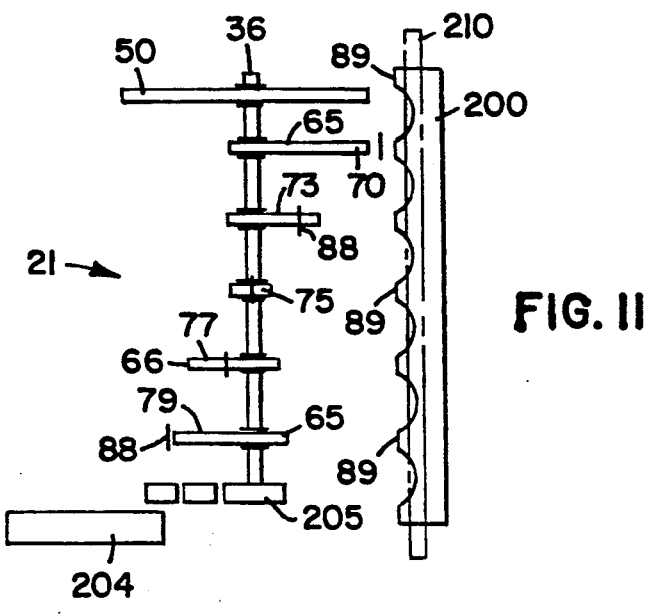
FIG. 11 is a plan view of the lens carousel illustrated in FIG. 8.

The optical system 21 preferably comprises a lens carousel 63, an end view of which is illustrated in FIG. 8 (as viewed from the front end of the printer-processor 10) and a plan view of which is illustrated in FIG. 11. The lens carousel 63 contains a plurality of wedge-shaped lens decks 65 which are mounted upon a central, rotatable carousel axis 36. FIG. 7 illustrates a single, exemplary lens deck 65. The lens decks 65 are rotatable between a position in the optical path and a position outside the optical path of the light beam. The lens decks 65 are spaced from one other in the general longitudinal direction of the printer's optical path. Each lens deck 65 contains one or more lenses 66 of an appropriate focal length. The lens carousel 63 rotates automatically to line up the appropriate lens 66 with the negative 19 according to the size of image 25 desired. The two ends of the shaft 36 are mounted within suitable bearings which allow for rotation of the shaft 36 and for convenient removal of the lens carousel 63 when a different lens carousel 63, having a different set of lenses 66, is replaced into the printer-processor chamber 38.

As shown by the end view of FIG. 8, the lens decks 65 are positioned in a parallel, staggered relationship so as to cover a generally circular area. The lens deck 65 corresponding to the largest enlargement is farthest from the printing paper 22, and the smallest image lenses are closest to the paper 22, with the three intervening sized lens decks corresponding to the intermediate enlargement sizes.

An individual exemplary lens deck 65 is illustrated in FIG. 7. The inner portion of each lens deck 65 has an aperture 87 which accommodates the axis 36. In the preferred embodiment, the aperture 87 has a keyhole shape which corresponds to the keyhole shape of the axis 36. This design prevents undesirable movement and shifting of the lens decks 65 with respect to the axis 36. Mounted upon each lens deck 65 is at least one lens 66. The lens decks 65 containing multiple lenses are capable of printing multiple images 25 upon the paper 22 in a single exposure. The various lens decks 65 have lenses 66 of varying focal length, and each lens type corresponds to a different sized image 25. As illustrated in FIG. 7, the lenses 66 are, in the preferred embodiment, mounted onto a flat, rectangular plate 67. The plate 67 is then mounted into a corresponding aperture on the lens deck 65. The plate 67 is attached to the lens deck 65 by means of a plurality of suitable fasteners 68. In this manner, the position of the lenses 66 is adjustable.

Each lens deck 65 is spaced along the axis 36 at a suitable distance between the negative 19 and the printing surface or paper 22, depending upon the desired enlargement and the characteristics of the lens 66. In the preferred embodiment, the axis 36 is threaded so that the position of the lens deck 65 is easily adjustable for focusing purposes. This initial focusing operation of the lens carousel 63 should not require frequent subsequent adjustment by the user.

In the preferred embodiment, there are a total of five lens decks 65, with one of the decks 70 being a "dual" lens deck and having two lenses 66 of different focal lengths. However, the number of lens decks 65 could be greater or fewer than the number illustrated. The "front" (i.e., toward the left as viewed in FIG. 2 and toward the top as viewed in FIG. 11) or dual lens deck 70 has two lenses 71, 72. In the preferred embodiment, as explained below, the printer-processor 10 contains two different paper widths, with two preferred paper sizes being an eleven (11) inch width and a sixteen (16) inch width. The lens 71 corresponds to the largest print size available on the largest size paper, e.g., a 16×20 inch print. The lens 72 corresponds to the largest print available on the other paper size, e.g., an 11×14 inch print.

Behind the lens deck 70 is the lens deck 73 which contains a single lens 74 suitable for producing an 8×10 inch print. The next lens deck 75 contains two lenses 76 which each print the 5×7 inch size. The fourth lens deck 77 contains two lenses 78 suitable for forming 3½×5 inch images. The fifth lens deck 79 contains four lenses 80 which are capable of producing wallet size images, i.e., 2½×3½ inches. In the preferred embodiment, the printer-processor is capable of producing the following size prints as illustrated in FIG. 10: 2½×3½ inches (wallet size); 3½×5'5 inches ; 5×7 inches; 8 ×10 inches; 11×14 inches and 16×20 inches. Besides being able to print large sizes, multiple numbers of the smaller sizes can be printed in a single exposure: up to four wallet size, up to two 3½×5, and up to two 5×7's. In the preferred embodiment, the largest magnification range for the printer 10 is from 35 millimeter film to a 16×20 inch print. The smallest magnification is from a 70 millimeter negative to a wallet size print.

Figure 6:
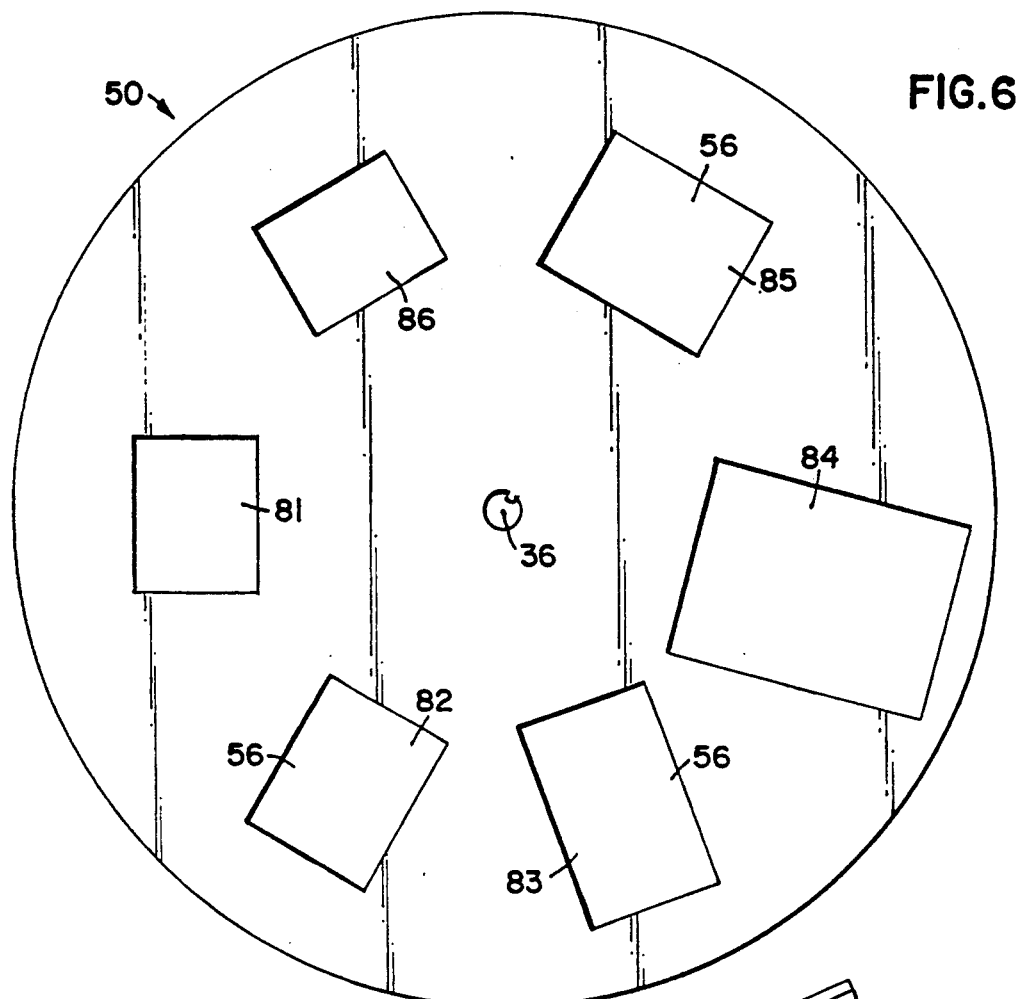
FIG. 6 is a side elevational view of the aperture disk utilized with the lens carousel of the present invention.

Permanently mounted to the front end of the axis 36 is an aperture disk 50, illustrated in FIG. 6. The aperture disk 50 blocks excess light from reaching the printing paper 22. The aperture disk or baffle disk 50 has a plurality of rectangular apertures 56. As the axis 36 is rotated so as to line up the appropriate lens deck 65 with the negative 19, the aperture disk 50 also rotates to line up the appropriate aperture 56 with the negative. The different size apertures 56 correspond to different image magnifications. The size of each aperture 56 corresponds to the image size passing through that point of the optical chamber 38.

In the preferred embodiment, the aperture disk 50 is flat and circular, containing six apertures 56 which correspond to the six sets of lenses on the lens decks 65. The apertures correspond to the following image sizes: aperture 81 corresponds to 16×20 inches; aperture 82 corresponds to 8×10 inches; aperture 83 corresponds to 3½×5 inches; aperture 84 corresponds to wallet size; aperture 85 corresponds to 5×7 inches; and aperture 86 corresponds to 11×14 inches.

A lens position sensing system monitors and controls the rotation and position of the lens carousel 63. In the preferred embodiment, as illustrated in FIGS. 7 and 11, there is a magnet 88 on the outer end of each lens deck 65. There is a longitudinal support bar 200 in the optical chamber 38 parallel to the axis 36 upon which a series of sensors 89 are mounted. There is one sensor 89 corresponding to the position of each lens deck 65. When the lens deck 65 is placed in position so as to be within the optical path, the magnet 88 on the lens deck actuates the corresponding electrical sensor 89.

The lens carousel 21 also includes means for maintaining the lens deck 65 stationary and in proper position. As illustrated in FIG. 7, the central portion of the outer end of the lens deck has a plate 201 containing a notch 202. A longitudinal carousel lock bar 210 serves as a stop for the lens deck 65 when the carousel lock bar 210 engages with the notch 202. The carousel lock bar 210 is mounted upon a rotatable assembly 203. When the lens carousel assembly 21 is rotating, the control assembly 203 moves the carousel lock bar 210 toward the right as viewed in FIG. 7 so as to disengage from the notch 202 and allow movement of the lens deck carousel 63. The carousel lock bar 210 returns to its engaged position when the next appropriate lens deck 65 is in a position so as to be within the optical path of the printer 11.

Figure 18:
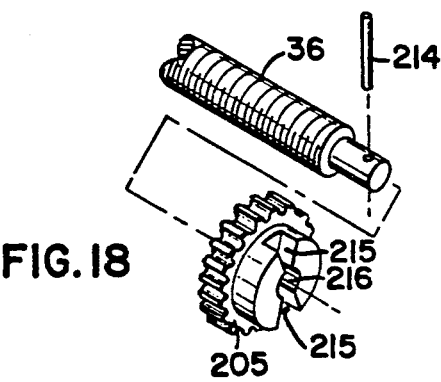
FIG. 18 is an exploded perspective view of the carousel shaft for the lens carousel illustrated in FIGS. 8 and 11.

A suitable motor 204, such as a brake gear motor, operates through gears 205 to cause rotation of the carousel shaft 36. One of the gears 205 has a central aperture 216 which accommodates one end of the carousel shaft 36. The power of the motor 204 ceases when the lens carousel 63 is in the proper position, so as to immediately stop rotation of the gears 205 and carousel shaft 36. The proper position of the lens carousel 63 is indicated when a particular magnet on a lens deck 65 activates its corresponding sensor. At that point, the lock bar 210 engages with the proper lens deck notch 202; in the preferred embodiment, a solenoid (not shown) moves the lock bar 210 in place. However, the notch 202 need not be precisely aligned with the lock bar 210 in order to properly position the lens deck 65. As illustrated in FIG. 18, the gear 205 has a radial groove 215 therein. There is a drive pin 214 inserted by a press fit through the end of the carousel shaft 36, the groove 215 accommodating the drive pin 214. When the lock bar 210 and notch 202 are not precisely aligned, the slack provided by the groove 215 allows slight movement of the carousel shaft so as to allow the lock bar 210 to engage with the notch 202 and force the lens deck 65 to become properly self-aligned.

In operation of the optics system, the operator inputs a code for the print size desired, which sends an electrical signal to cause rotation of the lens carousel 63 to automatically line up the appropriate lens deck 65 with the negative 19. Alternatively, if a package or multiple images of different sizes are required, the operator can input a code for the desired package and suitable software can activate the carousel 63 to automatically position the appropriate lenses 66 for multiple, sequential exposures of the desired size and quantity.

Figure 9:
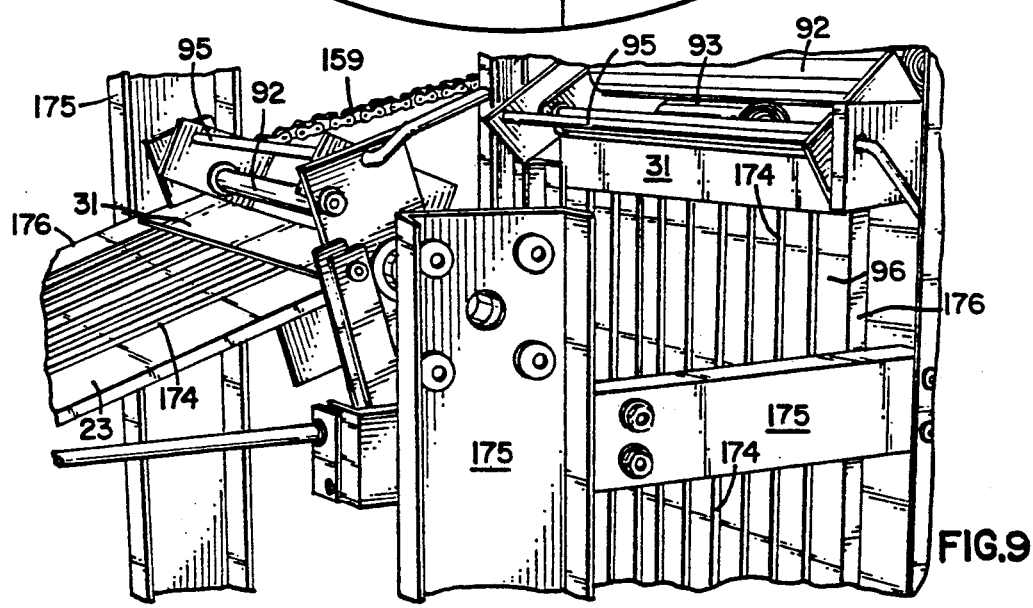
FIG. 9 is a perspective view of a portion of the paper advance mechanism and platens of the present invention.
Figure 16:
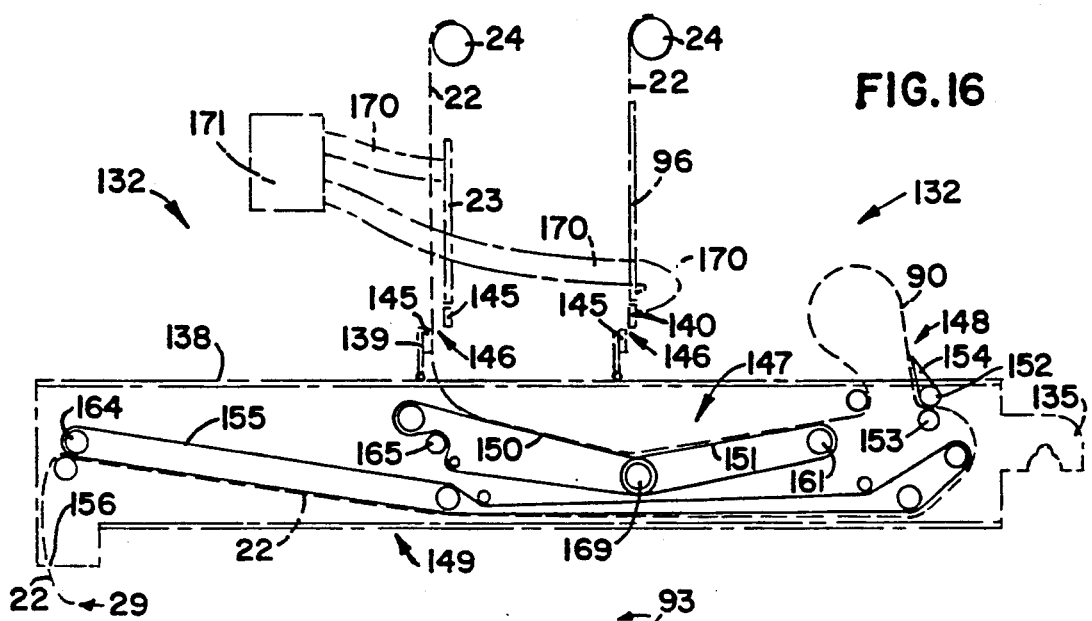
FIG. 16 is a diagramatic view of the paper advance, accumulation and transport means of the present invention.

FIGS. 2, 9 and 16 illustrate the movement of the light-sensitive printing paper 22 from its storage roll 24 to the transport system 132, and the means by which the printing paper 22 is supported when the timed exposure is made. The printer-processor 10 preferably contains two rolls of printing material, each front and rear roll 24 of printing material 22 having a corresponding front and rear platen 23, 96 against which the paper 22 is positioned during the exposure. The platens 23, 96 are mounted within the printer 11 by means of suitable support members 175. The paper 22 passes beneath a guide plate 31 (FIG. 9) which extends across the upper portion of each platen 23, 96. In the preferred embodiment, the platens 23, 96 hold the paper 22 in a vertical position to receive the light from the lens system 21. Each platen 23, 96 has two parallel guides or raised edges 176 to guide the printing paper 22 downwardly, with the space between the guides 176 depending upon the width of the print material 22. The platens 23 and 96 will be described further below.

In FIG. 2, a single paper roll 24 and paper platen 23 are illustrated for purposes of simplicity. However, FIGS. 9 and 16 illustrate the preferred embodiment, in which two rolls of paper 24 and paper platens 23, 96 are utilized. Preferably, the front roll of paper is ten (10) or eleven (11) inches in width, and the back roll of paper is sixteen (16) or twenty (20) inches in width. Each platen can accommodate slightly different paper widths by adjustment of the paper guides 176. With these paper sizes, several different photograph sizes can be printed. As illustrated in FIG. 10, the eleven (11) inch paper roll 27 can accommodate print sizes including 11×14 inches; 8×10 inches; 5×7 inches; 3½×5 inches; and 2½×3½ inches (wallet size). The sixteen (16) inch width paper 28 is suitable for a large enlargement such as a 16×20 inch size.

The distance between the negative 19 and forward platen 23 is approximately thirty-two (32) inches, and is approximately forty-three (43) inches from the back platen 96. The front platen 23 is positioned within the central chamber 39, whereas the back platen 23 is positioned proximate the front end of the rear chamber 40 in the preferred embodiment.

A suitable drive system is provided to transport the paper 22 from the storage spool 24 across the platen 23 and into the transport system 132. In the preferred embodiment, the paper 22 moves from the spool 24 between one or more pressure rollers 92 and a drive roller 93, as illustrated in FIGS. 2 and 9. The pressure rollers 92 are releasable from the drive roller 93 by means of a lever 95 so as to allow the paper to be threaded or adjusted between the rollers 92, 93. The pressure rollers 92 are then returned to their original position so as to grip the paper against the drive roller 93. After the exposure, the paper 22 is pushed downwardly by the drive roller 93 in order to be cut, transported to the processor, and processed.

Figure 17:
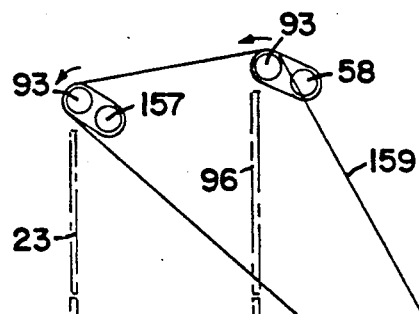
FIG. 17 is a diagramatic view of the drive system for the transport and accumulation means illustrated in FIG. 16.

To provide power to the drive rollers 93, a stepper motor is interconnected to each drive roller 93 by known means. As illustrated in FIG. 17, the stepper motor 157 drives the paper 22 from the front paper roll, and the stepper motor 58 drives the paper 22 from the rear paper roll. The stepper motor 157, 58, upon receipt of electrical signals, controls the amount of paper advance length depending upon the size of the image 25. Thus, the drive roller 93, powered by the stepper motor, acts as a metering device for the printing material 22. Each drive roller 93 has a one-way clutch mechanism which permits rotation of the drive roller 93 only in the counterclockwise direction, as illustrated by the arrows in FIG. 17. Because of the use of one-way clutches, the rotation of the drive roller 93 of the front platen 23 does not affect the drive of the rear platen 96 or vice versa. In the preferred embodiment, the paper drive means are located on only one end of the platen, rather than having drive means on both ends.

The support structure 175 for the front platen 23 includes means for rotating the front platen 23 to an upward position so that the rear platen 96 and the relatively wide printing material 22 is in the optical path. The front platen 23 can be raised by any suitable conventional means, such as a hand crank or lever, or other suitable mechanical means. Otherwise, the front platen 23 is maintained in a vertical position within the optical path of the light beams. In FIG. 9, the front platen 23 is in its raised position. When the front platen 23 is in its raised position outside the optical path, a trip mechanism (not shown) on the front platen 95 mechanically activates a switch on the wall 69 between the first 38 and second chambers 39 to signal to the control system which platen 23 or 96 is in position, and therefore which paper drive motor 157, 58 to activate.

In the preferred embodiment, the printer-processor 10 has an opening 33 proximate the optics system 21 capable of blocking out excess light. When the aperture 33 is completely opened, the light is directed through a rectangular opening 111. The opening 33 as illustrated is located in the wall 69 between the chambers 38, 39. However, the aperture 33 could also be located on the opposite side of the lens system 21, i.e., proximate the front wall 14 and to the left of the lens system 21 as viewed in FIG. 2. If the latter position of the opening 33 were utilized, then there would be an aperture in the wall 69 to permit the light rays 64 to pass from the lens system 21 and onto the printing material 22. In the preferred embodiment, such an opening in the wall 69 has a movable light shield (not shown) which completely covers the aperture in the wall 69 when light is permitted to enter the optical chamber 38, e.g., when a different lens carousel 63 is substituted within the optical chamber 38.

Figure 12:
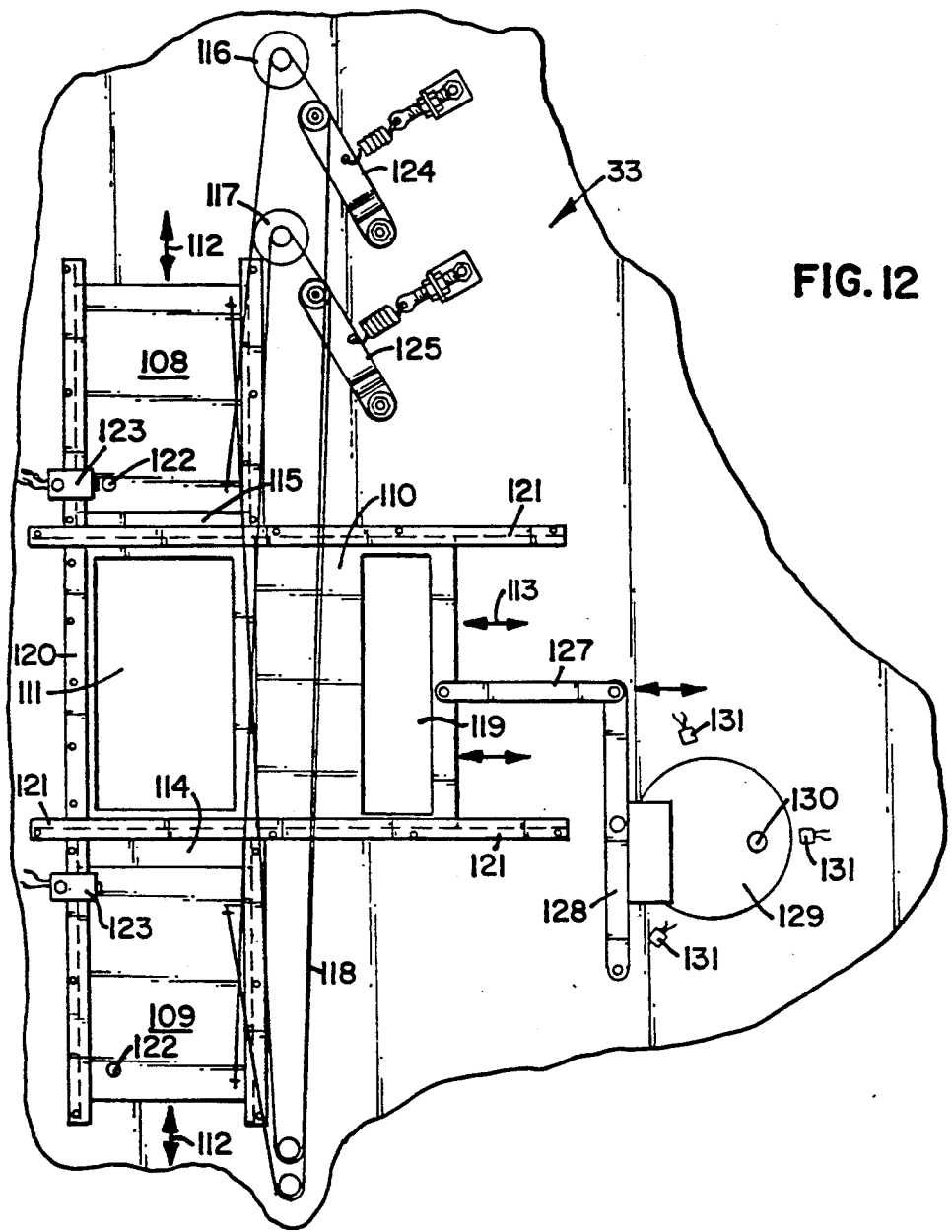
FIG. 12 is an elevational view of the printer-processor's baffle blades.

Proximate the opening 33 are three shutter blades, as shown in FIG. 12, including an upper baffle blade 108 and a lower baffle blade 109 which move vertically as shown by arrows 112 in FIG. 12. A third, transverse splitting baffle blade 110 moves horizontally as shown by the arrows 113. The variable baffle blades 108, 109 automatically mask off any unwanted prints, thereby saving emulsion paper 22. With the next exposure, the masking blades 108, 109 are repositioned in order to expose the unused paper. The splitting baffle blade 110 masks a portion of the aperture 33 so as to restrict the number of images which reach the printing paper 22. The baffle blade movement is guided by vertical and horizontal rails 120, 121. The completely opened aperture 111, as illustrated in FIG. 12, corresponds to the largest size picture, 16×20 in the preferred embodiment, magnified from a 35 millimeter negative.

In its open, or "home" position, the upper baffle blade 108 is in the upper position illustrated in FIG. 12, and the lower baffle blade 109 is in a lower position. In the preferred embodiment, means are provided to sense the positions of each of the blades 108, 109. The positions are sensed by the electrical sensors 123 which are proximate magnets 122 on the blades when the aperture 33 is closed. The sensors 123 are mounted to be stationary, and are preferably positioned upon the rails 120.

The operator enters a code or "split number" into the control system to correspond to the desired size and configuration of the opening 33. The light source 18 is activated and the lamphouse shutter 59 opens. The lamphouse shutter 59 closes when the pre-set exposure time expires. The sensor system indicates when the baffle blades 108, 109, 110 have returned to the home position and releases an electrical signal. When the exposure is complete and the paper 22 is advanced, the machine 10 is ready to print again.

The size of the opening 111 depends upon the number and size of the prints 25. An increased enlargement requires an increased opening and, of course, multiple images require a greater opening than a single image. For a single, intermediate size, both blades 108, 109 move from the home position, so that there is a central aperture 111 through which the image is projected. The lower edge 115 of the baffle blade 108 blocks above the top image line, and the upper edge 114 of the blade 109 blocks below the bottom image line. The amount of the movement of the baffle blades 108, 109 is preferably controlled by stepper motors 116, 117 interconnected to the blades 108, 109 respectively by a cable and pulley system 118. Each motor 116, 117 is also interconnected in the preferred embodiment to a cable tensioner arrangement 124, 125 respectively which controls movement of the cropping blades 108, 109.

The splitting baffle blade 110 is utilized to split a set of two or four images in half, and to cut off excess light from the vertical edges of the image. The baffle blade 110 has a rectangular aperture 119 therein. Movement of the splitting baffle blade 110 is preferably powered by a cam motor (not shown). The cam motor is linked to the transverse baffle blade 110 by means of a cam and control arms 127, 128. The transverse shutter 110 also has a position sensing means; in the preferred embodiment, a magnet 130 on the cam 129 activates one of a plurality of spaced sensors 131.

FIGS. 15 and 16 illustrate the transport and accumulation system 132 which automatically moves the exposed printing material 22 from one of the printer platens 23, 96 and into the processor 12. The transport system 132 has three major components, described below: the pre-accumulation area 147, the accumulation system 148, and the post-accumulation system 149. The transport system 132 is located directly below the bottom end of the platens 23 and above the processor 12. The dashed line of FIG. 16 represents the line of paper travel through the accumulation and transport system 132. Only paper 22 from one platen can proceed through the pre-accumulation system 147 at one time; therefore, for simplicity in the Drawings, only the paper path from the front platen 23 is illustrated, although the paper path from the rear platen 96 is the same.

In the preferred embodiment, the paper 22 enters the transport system 132 and is moved by the pre-accumulation conveyor 147 toward the back end 134 of the transport system 132, where it may be accumulated by the accumulation means 148. The printing material 22 is then transported toward the front end of the transport system 132 for entrance into the processor 12 by the lower post-accumulation conveyor 149.

Suitable support means are used to removably mount the transport system 132 in the printer 11. In the preferred embodiment, the back end 134 of the transport system 132 has hook members 135 which receive a transverse bar 136 (shown in FIG. 14) in the printer 11. This hook and bar arrangement attaches one end of the transport system 132 to the bottom of the printer 11. In the preferred embodiment, the front end 133 of the transport system 132 has pins 137 which attach to corresponding openings (not shown) in the printer 11. With this type of attachment arrangement, the transport system 132 is removable for inspections, repairs and the like.

The transport system 132 includes a chassis or support walls 138 which fit within the side walls 16 of the printer 11. The chassis 138 is generally rectangular in shape to correspond with the shape of the printer 11, having a front end 133 and a back end 134. Two cutters 139, 140 having blades which extend transversely across the transport system chassis 138 are provided to cut the printing material 22. Proximate each blade is a transverse opening 146 through which the print material 22 passes to enter the transport system 132. The cutters 139, 140 correspond to and are located beneath the front and back platens 23, 96 respectively. The cutters 139, 140 have suitable support brackets which attach the cutters 139, 140 within the support structure of the printer 11. Although the cutters 139, 140 are shown mounted upon the transport system chassis 138 in FIG. 10, the cutters 139, 140 are, in the preferred embodiment, permanently mounted to the main printer body above the transport system chassis 138.

The control system and stepper motor 157, 58 automatically advance the printing material 22 to the appropriate cut point. The cutters 139, 140 can be either automatic or manual. If manual, the cutter blades 145 are preferably connected to a pull rod 141 at the end of which is a handle 142 (see FIG. 1) at the front of the machine 10. The operator simply pulls the handle 142 to move one of the cutter blades 145 proximate the other, fixed cutter blade 145 to shear the paper 22 when it has been advanced to the cutting point. Approximately five (5) feet of paper will fill the transport system 132, and preferably the printer-processor 10 indicates to the operator when this amount of paper 22 has been printed, so that a cut can be made. Alternatively, the operator can cut the paper 22 at any point desired.

The pre-accumulation conveyor means 147 feeds the printing material 22 from the cutter (preferably located at the central area of the printer-processor 10) to the back end 134 of the transport system 132. In the preferred embodiment, the pre-accumulation conveyor means includes a downwardly-sloping conveyor belt 150 and an upwardly sloping conveyor belt 151, as illustrated in FIG. 16. Preferably, the conveyors 150, 151 are a plurality of continuous parallel belts 143 made of round plastic or rubber. The printing paper 22 is carried on top of the conveyor belts 150, 151. In the preferred embodiment, guide plates 144 are positioned upon each of the conveyor belts 150, 151 to hold the printing material 22 against the conveyor belts 150, 151 to facilitate their movement. The guide plates 144 are preferably made of textured stainless steel. The conveyor belts 150, 151 move the paper 22 to the right as viewed in FIGS. 15 and 16.

The accumulation means 148 is located proximate the back end 134 of the transport system 132. The accumulation system 148 serves to store any accumulated print material 22 until it is ready for entrance into the processor 12. The accumulation of the paper 22 occurs automatically and does not require intervention by the user. In addition, the accumulation system 148 provides a first-in, first-out system wherein the printing material 22 is transported into the processor 12 in the proper order.

The accumulation system 148 has stop means or a stop roller assembly for stopping the forward end of the print material 22 to initiate accumulation. The stop roller assembly includes a pair of guide rollers: an upper friction roller 152 and a lower roller 153. The rollers 152, 153 extend transversely across the width of the chassis 138 and are mounted in suitable bearings. The upper friction roller 152 is preferably a series of foam rollers which act as a friction stop. The upper roller 152 preferably has a transverse gate 154 which the paper 22 passes under before proceeding to the rapid transport system 149. The accumulated paper 90 causes the gate 154 to rotate upward as paper accumulates in the accumulation system 148. When the accumulation occurs, the forward edge of the paper 22 is stopped between the rollers 152, 153 and held down by the gate 154. The accumulated paper 90 loops upwardly so as to be stored within the holding area or rear chamber 40 of the printer 11, as shown in FIG. 16. The holding area 40 is capable of accommodating several feet of accumulated paper 90, if necessary.

The post-accumulation transport means 149 moves the paper 22 from the accumulation area 40 into the processor 12. The paper 22 enters the lower transport section 149 of the transport system 132 which is located at the lower end of the chassis 138 and preferably extends throughout the length of the chassis 138. Post-accumulation conveyor means transports the printing material 22 from the stop roller assembly 152 and to the processor entrance 29, i.e., from the right to the left as viewed in FIGS. 15 and 16. In the preferred embodiment, the post-accumulation conveyor means 149 consists of a series of parallel conveyor belts 155 having a series of guide rollers. The paper 22 is carried below the conveyor belts 155, as illustrated in FIG. 16, and suitable guide plates (not shown) hold the paper 22 against the conveyor belts 155. A roller 164 and suitable conveyor belts proximate the front end 133 of the rapid transport system 149 direct the paper 22 into a turn-around curve and into the processor entrance 29.

The drive system 162 for the paper advance and transport apparatus 132 is illustrated in FIG. 17. The pre-accumulation drive means 147 is capable of operating at two different speeds: a "rapid transport" mode; and a slower, normal mode. In the latter mode, the drive belts 150, 151 in the pre-accumulation drive are powered by the paper drive motors 157, 58, via the drive rollers 93, which advance the printing material 22 downwardly across the platen 23, 96 respectively and through the pre-accumulation area 147. In this manner there is no bunching of the printing material 22 in the pre-accumulation area 147; when paper 22 is advanced across the platen, it is also advanced through the pre-accumulation area 147. The drive rollers 157, 58 have one-way clutches so that when one paper drive roller is driven, the other remains stationary. In this manner, the drive systems for the two platens 23, 96 operate independently.

The stepper motors 157, 58 are interconnected to the paper drive chain 159 to provide means for driving the pre-accumulation conveyor system 147. The paper drive chain 159 passes around two idler sprockets 160 having a pre-accumulation sprocket 161 therebetween. Rotation of the pre-accumulation sprocket 161 causes movement of the pre-accumulation conveyor belts 150, 151. The conveyor belts 150, 151 are driven simultaneously via a central roller 169. The sprocket 161 has a one-way clutch mechanism allowing rotation only in the clockwise direction, as shown by the arrow in FIG. 17. There are a plurality of driven guide rollers for the conveyor belts 150, 151, including a roller 165 having a one-way clutch mechanism. The paper drive chain 159 is stationary during operation of the rapid transport system 149, described below. The stepper motors 157, 58 therefore are capable of driving both the paper advance across the platens and the paper advance through the pre-accumulation area 147.

The post-accumulation transport system 149 is also capable of operating at two different speeds. The first, "rapid transport" mode quickly moves the paper 22 into the processor 12 when the processor 12 is not already occupied with print material 22. The second, slower mode moves the paper 22 through the lower part of the transport system 132 at the same speed as the paper 22 is advanced through the processor 12. Accordingly, the lower conveyor means 155 is driven by one of two post-accumulation drive means. The conveyor belts 155 are driven continuously by the processor drive means 167 when the rapid transport drive means is inactive, so that paper 22 is advanced through the lower transport area 149 at the same speed as the paper is transported through the processor 12. The processor motor 167 causes rotation of the processor drive chain 166 in the counterclockwise direction, as illustrated by the arrow in FIG. 17. The roller 164 which drives the conveyor means 155 is geared to the processor drive means 167, so that activation of the processor 12 causes clockwise movement of the roller 164 and movement of the post-accumulation conveyor 155. The processor motor 167 continuously powers the lower transport system 149 unless the rapid paper transport motor 206 is in operation. When the rapid transport motor 206 is activated, it overrides the processor drive system so as to rapidly transport the accumulated paper 90 into the processor 12.

The rapid transport drive means or motor 206 is mounted onto the transport system chassis 138 and has a gear which rotates clockwise to drive the rapid transport drive chain 163 which links the motor 206 to the drive roller 164. Interconnected to the rapid transport drive chain 163 at its right end is the stop roller 153 of the accumulation system 148. When the rapid transport drive chain 163 does not rotate, the lower stop roller 153 is stationery, thereby causing accumulation of paper in the holding area or chamber 40, as illustrated in FIGS. 2 and 16. There is a central roller 165 having a one-way clutch which permits rotation only in the counterclockwise direction. This roller 165 is interconnected to the rapid transport drive chain 163, so that the chain 163 may travel only in a clockwise direction. Because of the one-way clutch of the roller 165, the motor 206 can override the stepper motors 157, 58.

The invention also includes means by which the rapid transport means 149 is activated and deactivated. In the preferred embodiment, the blade movement which occurs when the paper 22 is cut sends an electrical signal to the control system which initiates activation of the rapid transport drive means 206. Specifically, movement of a magnet (not shown) on the cutter blade 145 activates a sensor (not shown) which tells the electrical system to activate the rapid transport motor 206. The rapid transport motor and corresponding gear 206 is then activated, bringing the paper 22 through the stop rollers 152, 153 and rapidly through the post-accumulation system 149. When the paper 22 is transported from the accumulator 148 to the end of the post-accumulation system 149, an optical sensor 157 (FIG. 15) is activated and relays a signal to turn off the rapid transport motor 206.

In operation of the transport and accumulation drive system, the paper advance motors 157, 58 push the paper 22 across the platens 23, 96 and into the entrance of the transport system 132. If the paper 22 is not cut at the entrance 146 of the transport system, the paper advance motors drive the preaccumulation conveyor belts 150, 151 via the pre-accumulation drive sprocket 161, the paper 22 thereby advancing through the preaccumulation area 147 at the same speed as it moved across the platens 23, 96. The forward edge of the paper 22 is held by the stop roller assembly 152, 153, and the accumulated paper 90 is collected in the holding area 40 until the rapid transport motor 206 is activated.

When the paper 22 is cut, the rapid transport motor 206 is activated. The rapid transport motor 206 causes more rapid movement of the preaccumulation conveyor belts 150, 152 via the roller 165. In this manner, the rapid transport drive motor 206 overrides the paper advance drive motor, and the sprocket 161 becomes a driven sprocket rather than a drive sprocket because of its one-way clutch mechanism. Activation of the rapid transport motor 206 also causes rotation of the stop roller 153, thereby advancing paper 22 from the accumulation area 40 and into the post-accumulation area 149. The rapid transport motor 206 drives the post-accumulation conveyor belt 155 via a gear 206 proximate the rapid transport motor. There are a series of driven rollers which guide the conveyor means 155 during rapid transport, including a roller 164 having a one-way clutch mechanism. At the end of the post-accumulation area 149, the paper 22 makes a turnaround curve into the processor entrance 29, at which point the paper 22 is driven at a slower speed by the processor drive motor 167.

Proximate the end of the post accumulation area 149 is a sensor 157 which detects the presence of paper 22 at that point. When the paper 22 reaches the sensor 157, a signal is relayed to turn the rapid transport motor 206 off. When the rapid transport motor 206 is off, the paper 22 in the post-accumulation area 149 continues its movement by being driven by the processor motor 167 via the roller 164. When this occurs, the gear 206 proximate the rapid transport motor, which has a one-way clutch mechanism, is overridden by the processor drive means. The rapid transport motor 206 causes advancement of the paper 22 through the post-accumulation area in only about ten seconds, whereas the processor drive means causes the paper advancement to take a few minutes. Thus, the rapid transport system reduces the total printing and processing time which is advantageous for the photofinisher. The accumulator of the present invention compensates for the difference between the printer and processor speeds. The accumulation system 148 prevents excess paper 22 from being directed into the processor, while maintaining an efficient transfer of paper from the printer 11 to the processor 12.

The processor 12 is a roller transport processor in which the exposed paper 22 enters at point 29 and exits at point 32. There are a series of tanks 30 for the various chemicals, and the paper is transported between the tanks 30 by means of a plurality of rollers 34.

A transverse line of sensors (not shown) at the end of the transport system 149 and across the bottom plate of the transport chassis 138 determines the width of the paper 22 and sends an electrical signal which controls the replenishment of the processor chemical solutions. In the processor 12, the exposed paper 22 is passed through appropriate tempered chemistry such as a developer (tank 1); a bleach fix (tank 2); and a stabilizer (tanks 3 and 4). The paper 22 is then dried and removed from the tray 90 at the end of the processor 12. Once the tanks 30 have been filled with these baths, and the chemicals have been brought to the right temperature, the processor 12 is ready for operation. A variable amount of time is required between the time the exposed print is fed into the processor and the time in which a dry print exits the processor, depending upon the particular process utilized.

In the preferred embodiment, the printer 11 can be elevated above the processor 12, as illustrated in FIG. 14. In the preferred embodiment, the printer 11 is elevated above the processor 12 approximately eighteen inches. This is accomplished by support means or arms 103 interconnected to the bottom of the printer body 11 and the top of the processor body 12. At the upper and lower ends of the arms 103 are pivotable connections 104 which allow the arms 103 to move between a downward, horizontal position and a upward, vertical position. Movement of the supports or arms 103 can be controlled by either a manual crank or a motorized mechanism (not shown). The crank or motor is interconnected to the support arms 103 by a series of chains and gears which move the supports 103.

Figure 19:
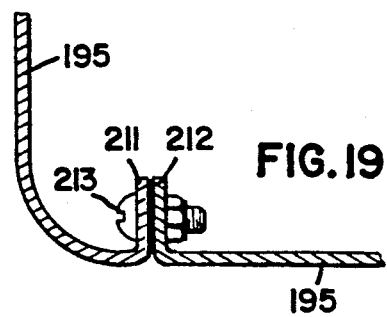
FIG. 19 is a sectional view of the framework of the printer-processor.

In the preferred embodiment, the framework or housing 195 for the printer-processor 10 has a "unibody" construction with no fasteners being visible from the exterior. As illustrated in FIG. 19, the connection between adjacent framework panels 195 is accomplished by interconnecting inwardly projecting flanges 211, 212. The flanges 211, 212 abut against each other and a suitable fastener 213, such as a bolt, is inserted through both flanges 211, 212. Preferably, the housing 195 is made of a suitable material such as aluminum of approximately ⅛ inch in thickness. The bolts 213 are spaced at suitable intervals, such as approximately every six inches. This type of framework interconnection is high in strength and allows the printer-processor to have an aesthetically pleasing appearance.

2. Description of Platens 23, 96

As illustrated by FIGS. 9, 13, 16, 20a and 20b, the paper 22 is supported and held against the platens 23, 96 by means of a vacuum system. Each platen 23, 96 is interconnected to a vacuum hose 170. Air is withdrawn from the platens 23, 96 through the hoses 170 by means of a vacuum motor 171. The vacuum hose inlet is in fluid communication with a plenum or manifold 172 on each platen 23, 96. In the preferred embodiment, each platen 23, 96 has a series of longitudinal, parallel grooves 174 or channels, the grooves terminating in a series of apertures 173 in the plenum 172. The vacuum is applied to the printing paper 22 via the grooves 174. The grooves 174 on the platens 23, 96 are spaced approximately one and one-half (1½) to two (2) inches apart. The grooves 174 preferably taper closer to the surface of the platens 23, 96 toward the bottom/side edge 23a of the platens 23, 96. In this manner, the printing material 22 is held flat against the appropriate platen 23, 96 during the exposure to provide edge-to-edge print sharpness. When the exposure is complete, the paper advance drive means pushes the exposed printing material 22 downwardly into the transport system 132 so as to present additional printing material 22 on the platen which is ready for exposure.

Figure 20A:
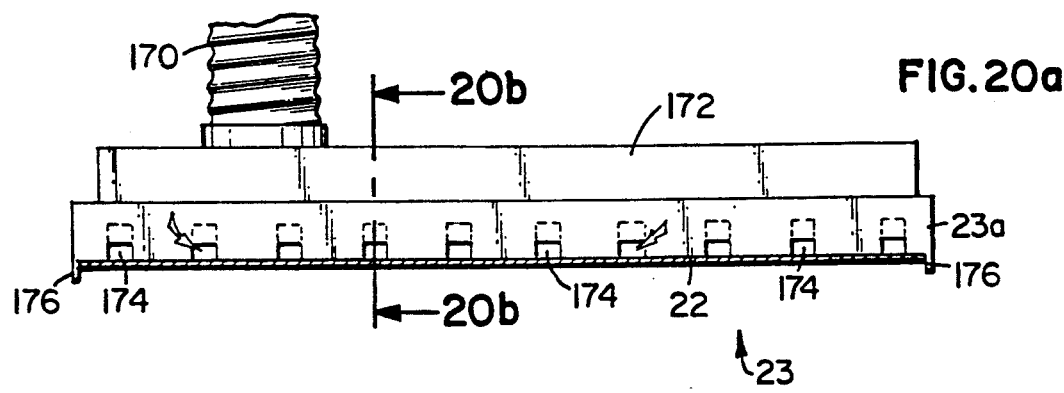
FIG. 20a is a bottom view of the platen of FIG. 13.
Figure 20B:
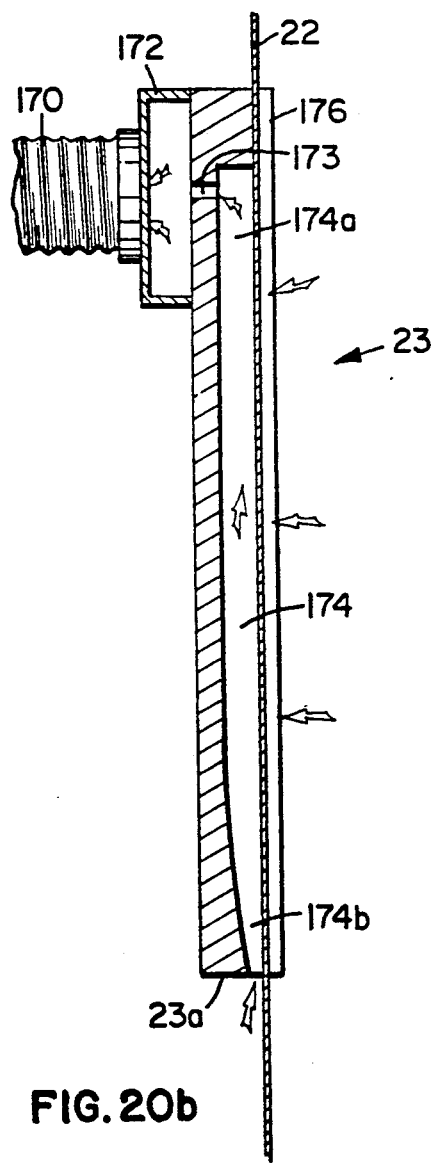

Referring next to FIGS. 20a and 20b, the taper of the grooves 174 is illustrated, as well as the grooves 174 extension through the bottom/side 23a edge of platen 23. Arrows in FIGS. 20a and 20b illustrate the fluid flow. The extension of the groove 174, or channel, through the side edge 23a of platen 23, provides for a more uniform vacuum as the leading edge of the light sensitive material 22, traverses down the longitudinal length of the platen 23.

As those skilled in the art will appreciate, without a source of fluid as the paper progresses down the platen 23, the vacuum increases as the paper covers more of the platen surface due to the inlet apertures being covered. The vacuum eventually reaches a maximum value based upon the vacuum means. Therefore, the light sensitive material 22 is drawn more forcefully against the platen 23 making it difficult to advance the paper 22 and increasing the likelihood that the paper 22 will be damaged by the additional force required to move it. However, by providing a certain inlet for fluid or air, the vacuum is never allowed to exceed a certain value, thereby ensuring ease of the paper 22 transport down the face of the platen 23.

Still referring to FIGS. 20a and 20b, it can be seen that the first end 174a of grooves 174 is in fluid communication through manifold 172 to the vacuum source through fluid communication means 170. Second end 174b of grooves 174 extends through the side edge 23a. Those skilled in the art will recognize that while in the preferred embodiment, the fluid source is the atmosphere, the fluid source might also be stored compressed gas or filtered air among others. The key design considerations being that the vacuum is strong enough to hold the paper 22 flat against the platen 23 during exposure, but not so strong as to require excessive force to move the paper 22. Further, those skilled in the art will recognize that rather than the grooves 174 opening through the side edge 23a, the grooves 174 might open through the back of the platen or a second manifold (not shown) or some other supply might be connected at second end 174b. Additionally, the vacuum means (i.e., the "sink") might be at the middle of the groove 174 and the supply at the ends. Those skilled in the art will also recognize that the grooves 174 might be arranged in other shapes, such as serpentine.

Preferably, the groove 174 tapers toward the second end 174b in order to provide the proper opening for the required vacuum. Preferably, the groove depth at 174a is ⅛ inch while the opening through side edge 23a is 1/16 inch.

The ratio of the transverse width of platen 23 of surface area to groove 174 is preferably arranged and configured such that the paper is not drawn into the grooves forming "hills and valleys" in the paper, but is instead arranged and configured such that the paper lies flat against the platen surface to ensure crisp exposures.

3. Operation of Printer Processor 10

The operation of the printer-processor 10 will now be described. When the operator switches the electrical power on, the following components are activated: the electronic control system; the light source 18 in the lamphouse 17; the vacuum motor for the platens; the lamphouse exhaust blower; the pressure blower 107 for the printer cabinet; and the processor functions, i.e., the processor paper transport, recirculation pumps and chemistry temperature system. The operator inputs certain information into the printer control system via the control panel 37. Specifically, the operator inputs the negative size being utilized and selects the appropriate carousel number. The color filters 60 are adjusted, and the exposure time is set. The operator inputs information to the processor control system via the controls 58 in order to set the chemistry temperature, drier temperature and replenishment time for the processor.

The negative 19 is loaded in the negative carrier 20, and the printing paper 22 is loaded in an appropriate cassette (not shown) which protects the paper from light. If necessary, the negative carrier 20 is rotated so as to place the negative 19 in the proper orientation. The paper 22 is threaded through the drive roller arrangement 93 and is positioned against one of the platens 23, 96.

The operator also inputs whether a single print, multiple prints, or a package of different sizes is desired. This information tells the printer-processor's control system the number of exposures needed; the appropriate position of the lens carousel 63; and the proper position of the opening 33. When the image size is selected, the appropriate platen 23, 96 is placed in position and the machine 10 preferably outputs a signal to remind the operator whether the negative carrier 20 should be rotated. The lamphouse or light box 17 is moved into position proximate the negative 19. The exposure sequence then takes place. The baffle blades are automatically positioned around the aperture 33 to make a split if needed. The bottom variable baffle blade is positioned below the lower image line, and the upper variable baffle blade is positioned above the upper image line. The lamphouse shutter 59 is opened, thereby allowing the light from the light source 18 to be directed through the mirror box 101 and through the negative 19. The light 64 is directed through the lens system 21 and through the opening 33 and onto the paper 22. The paper 22 is exposed to the image for the predetermined amount of time, after which the lamphouse shutter 59 is closed, and the blades of the opening 33 are returned to their closed or home position.

The appropriate stepper motor 157, 58, depending on which width paper was utilized, then advances the paper 22 the distance needed for the next print. If the entire width of the paper has not yet been utilized, the exposure sequence may be repeated before the paper is advanced. After advancing to the cut point, the paper 22 can be cut by the operator if desired. Alternatively, additional adjacent prints may be exposed to make the most efficient use of the paper 22.

The paper 22 then automatically enters the preaccumulation conveyor system 148. If appropriate, the paper 22 can enter directly into the rapid transport system 149 and into the processor entrance 29. Alternatively, if the processor 12 or lower paper transport area are full, the forward end of the paper will be held by the stop roller assembly 53, thus causing paper accumulation in the holding chamber 40. Once the paper 22 is cut, the paper 22 is then advanced to the entrance 29 of the processor 12 by the rapid transport system 149. After the paper 22 goes through the processing chemicals and drying sequence contained within the processor 12, a finished photograph exits the processor 12 and into the basket 217.

It is to be understood that while a certain embodiment of the present invention have been illustrated and described, the invention is not to be limited to the specific form or arrangement of parts herein described and shown. Changes can be made in detail, especially in matters of shape, size and arrangement of parts, within the principles of the present invention, to the full extent indicated by the broad general meaning of the appended claims.

What is claimed is:

1. A platen for print material in a photographic printer and the like, the printer having vacuum means for creating a vacuum, comprising:
   (a) a manifold, in fluid communication with the vacuum means; and
   (b) a printing member having a surface generally defining a mean plane and having first and second side edges, said surface having a plurality of grooves defined therein, said grooves having a first end and a second end, said grooves being in fluid communication with said manifold at said first end, said manifold arranged and configured proximate said first side edge and said grooves extending approximately from said manifold across said printing surface, wherein the second end of said grooves extend through said second side edge wherein the second end of said grooves are in fluid communication with a fluid source, whereby when the print material advances along said surface covering said grooves the vacuum does not increase above a certain level due to the fluid source.

2. The platen as recited in claim 1, wherein said fluid source is the atmosphere.

3. The platen as recited in claim 1, wherein said grooves are in fluid communication with said manifold at said first end.

4. The platen as recited in claim 1, wherein each of said grooves extend through the same side edge of the platen.

5. The platen as recited in claim 1, wherein the grooves are generally arranged parallel to one another.

6. A platen for print material in a photographic printer and the like, the printer having vacuum means for creating a vacuum, comprising:
   (a) a manifold, in fluid communication with the vacuum means; and
   (b) a printing member having a surface generally defining a mean plane and at least one side edge, said surface having a series of grooves defined therein, said grooves having a first end and a second end, said grooves being in fluid communication with said manifold, and the second end of said grooves extending through said side edge wherein the second end of said grooves are in fluid communication with a fluid source, whereby when the print material advances along said surface covering said grooves the vacuum does not increase above a certain level due to the fluid source, wherein said grooves taper in depth as said grooves approach said side edge, wherein the amount of the taper is arranged and configured so as to determine the final vacuum so as to allow the print material to move along said platen and to hold the paper flat against said mean plane.

7. The platen as recited in claim 6, wherein said grooves taper at said second end to approximately one-half of the mean depth of said grooves.

8. An apparatus for holding light sensitive web material during exposure, said apparatus comprising:
   (a) a surface generally forming a mean plane and having a first and second side edge, said mean plane having lowered channels formed therein so as to form an alternating series of surface and channel areas, said channels beginning proximate said first side edge and extending through said second side edge so as to be open to the atmosphere, said surface being arranged and configured to allow the light sensitive web material to directly cover said channel areas,
   (b) vacuum means, in fluid communication with said channels proximate said first side edge, for creating a vacuum to hold the light sensitive web material flat against the platen during exposure, wherein the vacuum is maintained below a predetermined value without adjusting said vacuum means due to the channels always having a portion exposed to the atmosphere.

9. The apparatus as recited in claim 8, wherein the ratio of transverse surface area of said surface and channels is arranged and configured in accordance with the highest vacuum so as to hold the light sensitive web material flat.

10. The apparatus as recited in claim 8, wherein said channels are straight.

11. The apparatus as recited in claim 8, wherein each of said channels extends through said second side edge.

12. The apparatus as recited in claim 8, wherein the channels are arranged generally parallel to one another.

* * * * *